US011887610B2

(12) United States Patent
Xia et al.

(10) Patent No.: US 11,887,610 B2
(45) Date of Patent: Jan. 30, 2024

(54) AUDIO ENCODING AND DECODING METHOD AND AUDIO ENCODING AND DECODING DEVICE

(71) Applicant: Huawei Technologies Co., Ltd., Shenzhen (CN)

(72) Inventors: Bingyin Xia, Beijing (CN); Jiawei Li, Beijing (CN); Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/862,712

(22) Filed: Jul. 12, 2022

(65) Prior Publication Data

US 2022/0343926 A1 Oct. 27, 2022

Related U.S. Application Data

(63) Continuation of application No. PCT/CN2021/071327, filed on Jan. 12, 2021.

(30) Foreign Application Priority Data

Jan. 13, 2020 (CN) ......................... 202010033973.0

(51) Int. Cl.
*G10L 19/02* (2013.01)
*G10L 25/18* (2013.01)
*G10L 25/21* (2013.01)

(52) U.S. Cl.
CPC .............. *G10L 19/02* (2013.01); *G10L 25/18* (2013.01); *G10L 25/21* (2013.01)

(58) Field of Classification Search
CPC ......... G10L 19/02; G10L 25/18; G10L 25/21; G10L 21/038; G10L 19/0208; G10L 19/0017; G10L 19/167
See application file for complete search history.

(56) References Cited

U.S. PATENT DOCUMENTS

| | | | | |
|---|---|---|---|---|
| 6,226,604 | B1 | 5/2001 | Ehara et al. | |
| 8,560,304 | B2 * | 10/2013 | Choo | G10L 21/038 381/23 |
| 10,224,048 | B2 * | 3/2019 | Kamano | G10L 21/038 |
| 2008/0027012 | A1 | 1/2008 | Kim et al. | |

(Continued)

FOREIGN PATENT DOCUMENTS

| | | | |
|---|---|---|---|
| CN | 102194458 | A | 9/2011 |
| CN | 102750954 | A | 10/2012 |

(Continued)

*Primary Examiner* — Douglas Godbold
(74) *Attorney, Agent, or Firm* — Conley Rose, P.C.

(57) ABSTRACT

An audio decoding method includes obtaining an encoded bitstream; performing bitstream demultiplexing on the encoded bitstream, to obtain a high frequency band parameter of a current frame of an audio signal, wherein the high frequency band parameter indicates a location, a quantity, and an amplitude or energy of a tone component comprised in a high frequency band signal of the current frame; obtaining a reconstructed high frequency band signal of the current frame based on the high frequency band parameter; and obtaining an audio output signal of the current frame based on the reconstructed high frequency band signal of the current frame.

23 Claims, 4 Drawing Sheets

(56) References Cited

U.S. PATENT DOCUMENTS

| | | | | |
|---|---|---|---|---|
| 2008/0270125 | A1* | 10/2008 | Choo | G10L 21/038 704/E21.011 |
| 2008/0312912 | A1 | 12/2008 | Choo et al. | |
| 2009/0248404 | A1 | 10/2009 | Ehara et al. | |
| 2013/0144611 | A1 | 6/2013 | Ishikawa et al. | |
| 2015/0046171 | A1* | 2/2015 | Grancharov | G10L 19/002 704/500 |
| 2015/0162010 | A1* | 6/2015 | Ishikawa | G10L 21/038 704/500 |
| 2015/0287417 | A1* | 10/2015 | Disch | G10L 19/025 704/500 |
| 2016/0111103 | A1* | 4/2016 | Nagisetty | G10L 21/038 704/501 |
| 2016/0254004 | A1* | 9/2016 | Norvell | G10L 19/0204 704/500 |
| 2017/0069328 | A1* | 3/2017 | Kawashima | G10L 19/002 |
| 2017/0069332 | A1* | 3/2017 | Disch | G10L 19/0204 |
| 2017/0169831 | A1* | 6/2017 | Kaniewska | B41K 1/10 |

FOREIGN PATENT DOCUMENTS

| | | | |
|---|---|---|---|
| CN | 103098130 | A | 5/2013 |
| CN | 104584124 | A | 4/2015 |
| CN | 105408957 | A | 3/2016 |
| CN | 106133831 | A | 11/2016 |
| EP | 4131261 | A1 | 2/2023 |
| JP | H08162963 | A | 6/1996 |
| JP | 2003233395 | A | 8/2003 |
| JP | 2007187905 | A | 7/2007 |
| JP | 2008096567 | A | 4/2008 |
| JP | 2019070823 | A | 5/2019 |
| WO | 2014115225 | A1 | 7/2014 |

* cited by examiner

AUDIO ENCODING AND DECODING METHOD AND AUDIO ENCODING AND DECODING DEVICE

CROSS-REFERENCE TO RELATED APPLICATIONS

This application is a continuation application of International Patent Application No. PCT/CN2021/071327, filed on Jan. 12, 2021, which claims priority to Chinese Patent Application No. 202010033973.0, filed on Jan. 13, 2020. The disclosures of the aforementioned applications are hereby incorporated by reference in their entireties.

TECHNICAL FIELD

This application relates to the field of audio signal encoding and decoding technologies, and in particular, to an audio encoding and decoding method and an audio encoding and decoding device.

BACKGROUND

As quality of life is improved, a requirement for high-quality audio is constantly increased. An audio signal usually needs to be encoded first, and then an encoded bitstream is transmitted to a decoder side, to better transmit the audio signal on a limited bandwidth. The decoder side decodes the received bitstream to obtain a decoded audio signal, and the decoded audio signal is used for play.

How to improve quality of the decoded audio signal becomes a technical problem that urgently needs to be resolved.

SUMMARY

Embodiments of this application provide an audio encoding and decoding method and an audio encoding and decoding device, to improve quality of a decoded audio signal.

To resolve the foregoing problem, the embodiments of this application provide the following technical solutions.

According to a first aspect, an audio encoding method is provided. The method includes obtaining a current frame of an audio signal, where the current frame includes a high frequency band signal; obtaining a high frequency band parameter of the current frame based on the high frequency band signal, where the high frequency band parameter is used to indicate a location, a quantity, and an amplitude or energy of a tone component included in the high frequency band signal; and performing bitstream multiplexing on the high frequency band encoding parameter, to obtain an encoded bitstream.

With reference to the first aspect, in an implementation, the high frequency band parameter includes a location and quantity parameter of the tone component and an amplitude parameter or an energy parameter of the tone component.

With reference to the first aspect or the foregoing implementation of the first aspect, in an implementation, a high frequency band corresponding to the high frequency band signal includes at least one frequency region, one frequency region includes at least one sub-band, and the obtaining a high frequency band parameter of the current frame based on the high frequency band signal includes determining a location and quantity parameter of a tone component in a current frequency region in the at least one frequency region and an amplitude parameter or an energy parameter of the tone component in the current frequency region based on a high frequency band signal of the current frequency region.

With reference to the first aspect or the foregoing implementations of the first aspect, in an implementation, before the determining a location and quantity parameter of a tone component in a current frequency region in the at least one frequency region and an amplitude parameter or an energy parameter of the tone component in the current frequency region based on a high frequency band signal of the current frequency region, the method includes determining whether the current frequency region includes a tone component; and when the current frequency region includes a tone component, determining the location and quantity parameter of the tone component in the current frequency region in the at least one frequency region and the amplitude parameter or the energy parameter of the tone component in the current frequency region based on the high frequency band signal of the current frequency region.

With reference to the first aspect or the foregoing implementations of the first aspect, in an implementation, the high frequency band parameter of the current frame further includes tone component indication information, and the tone component indication information is used to indicate whether the current frequency region includes a tone component.

With reference to the first aspect or the foregoing implementations of the first aspect, in an implementation, the determining a location and quantity parameter of a tone component in a current frequency region in the at least one frequency region and an amplitude parameter or an energy parameter of the tone component in the current frequency region based on a high frequency band signal of the current frequency region includes performing peak search in the current frequency region based on the high frequency band signal of the current frequency region in the at least one frequency region, to obtain at least one of peak quantity information, peak location information, and peak amplitude information of the current region; and determining the location and quantity parameter of the tone component in the current frequency region and the amplitude parameter or the energy parameter of the tone component in the current frequency region based on the at least one of the peak quantity information, the peak location information, and the peak amplitude information of the current frequency region.

With reference to the first aspect or the foregoing implementations of the first aspect, in an implementation, the performing peak search in the current frequency region based on the high frequency band signal of the current frequency region in the at least one frequency region, to obtain at least one of peak quantity information, peak location information, and peak amplitude information of the current region includes performing peak search in the current frequency region based on at least one of a power spectrum, an energy spectrum, or an amplitude spectrum of the current frequency region in the at least one frequency region, to obtain the at least one of the peak quantity information, the peak location information, and the peak amplitude information of the current region.

With reference to the first aspect or the foregoing implementations of the first aspect, in an implementation, the determining the location and quantity parameter of the tone component in the current frequency region and the amplitude parameter or the energy parameter of the tone component in the current frequency region based on the at least one of the peak quantity information, the peak location information, and the peak amplitude information of the current frequency region includes determining location information, quantity information, and amplitude information of the tone component in the current frequency region based on the at least one of the peak quantity information, the peak location information, and the peak amplitude information of the current frequency region; and determining the location and quantity parameter of the tone component in the current frequency region and the amplitude parameter or the energy parameter of the tone component in the current frequency region based on the location information, the quantity information, and the amplitude information of the tone component in the current frequency region.

With reference to the first aspect or the foregoing implementations of the first aspect, in an implementation, the location and quantity parameter of the tone component in the current frequency region includes N bits, N is a quantity of sub-bands included in the current frequency region, and the N bits are in a one-to-one correspondence with the sub-bands included in the current frequency region; and if a first sub-band included in the current frequency region includes a peak, a value of a bit that is in the N bits and that corresponds to the first sub-band is a first value; or if a second sub-band included in the current frequency region does not include a peak, a value of a bit that is in the N bits and that corresponds to the second sub-band is a second value, where the first value is different from the second value.

With reference to the first aspect or the foregoing implementations of the first aspect, in an implementation, the location and quantity parameter of the tone component in the current frequency region includes N bits, N is a quantity of sub-bands included in the current frequency region, and the N bits are in a one-to-one correspondence with the sub-bands included in the current frequency region; and if a first sub-band included in the current frequency region includes a tone component, a value of a bit that is in the N bits and that corresponds to the first sub-band is a first value; or if a second sub-band included in the current frequency region does not include a tone component, a value of a bit that is in the N bits and that corresponds to the second sub-band is a second value, where the first value is different from the second value.

With reference to the first aspect or the foregoing implementations of the first aspect, in an implementation, the high frequency band parameter further includes a noise floor parameter of the high frequency band signal.

According to a second aspect, an audio decoding method is provided, including obtaining an encoded bitstream; performing bitstream demultiplexing on the encoded bitstream, to obtain a high frequency band parameter of a current frame of an audio signal, where the high frequency band parameter is used to indicate a location, a quantity, and an amplitude or energy of a tone component included in a high frequency band signal of the current frame; obtaining a reconstructed high frequency band signal of the current frame based on the high frequency band parameter; and obtaining an audio output signal of the current frame based on the reconstructed high frequency band signal of the current frame.

With reference to the second aspect, in an implementation, the high frequency band parameter includes a location and quantity parameter of the tone component of the high frequency signal of the current frame and an amplitude parameter or an energy parameter of the tone component.

With reference to the second aspect or the foregoing implementation of the second aspect, in an implementation, a high frequency band corresponding to the high frequency band signal includes at least one frequency region, and one frequency region includes at least one sub-band; and the location and quantity parameter that is of the tone component of the high frequency signal of the current frame and that is included in the high frequency band parameter includes a location and quantity parameter of a tone component in the at least one frequency region, and the amplitude parameter or the energy parameter of the tone component of the high frequency signal of the current frame includes an amplitude parameter or an energy parameter of the tone component in the at least one frequency region.

With reference to the second aspect or the foregoing implementations of the second aspect, in an implementation, the performing bitstream demultiplexing on the encoded bitstream, to obtain a high frequency band parameter of a current frame of an audio signal includes obtaining a location and quantity parameter of a tone component in a current frequency region in the at least one frequency region; and obtaining an amplitude parameter or an energy parameter of the tone component in the current frequency region from the encoded bitstream through parsing based on the location and quantity parameter of the tone component in the current frequency region.

With reference to the second aspect or the foregoing implementations of the second aspect, in an implementation, the obtaining an amplitude parameter or an energy parameter of the tone component in the current frequency region from the encoded bitstream through parsing based on the location and quantity parameter of the tone component in the current frequency region includes determining a quantity parameter of the tone component in the current frequency region based on the location and quantity parameter of the tone component in the current frequency region; and obtaining the amplitude parameter or the energy parameter of the tone component in the current frequency region from the encoded bitstream through parsing based on the quantity parameter of the tone component in the current frequency region.

With reference to the second aspect or the foregoing implementations of the second aspect, in an implementation, the performing bitstream demultiplexing on the encoded bitstream, to obtain a high frequency band parameter of a current frame of an audio signal includes obtaining a location and quantity parameter of a tone component in a current frequency region in the at least one frequency region; determining a location parameter of the tone component in the current frequency region and a quantity parameter of the tone component in the current frequency region based on the location and quantity parameter of the tone component in the current frequency region; and obtaining an amplitude parameter or an energy parameter of the tone component in the current frequency region from the encoded bitstream through parsing based on the quantity parameter of the tone component in the current frequency region.

With reference to the second aspect or the foregoing implementations of the second aspect, in an implementation, the obtaining a location and quantity parameter of a tone component in a current frequency region in the at least one frequency region includes obtaining tone component indication information of the current frequency region, where the tone component indication information is used to indicate whether the current frequency region includes a tone component; and when the current frequency region includes a tone component, obtaining the location and quantity parameter of the tone component in the current frequency region in the at least one frequency region.

With reference to the second aspect or the foregoing implementations of the second aspect, in an implementation, the obtaining a location and quantity parameter of a tone component in a current frequency region in the at least one frequency region includes reading N bits from the encoded bitstream based on a quantity of sub-bands included in the current frequency region, where the N bits are included in the location and quantity parameter of the tone component in the current frequency region, N is the quantity of sub-bands included in the current frequency region, and the N bits are in a one-to-one correspondence with the sub-bands included in the current frequency region.

With reference to the second aspect or the foregoing implementations of the second aspect, in an implementation, the obtaining a reconstructed high frequency band signal of the current frame based on the high frequency band parameter includes determining a location of the tone component in the current frequency region based on the location and quantity parameter of the tone component in the current frequency region; determining, based on the amplitude parameter or the energy parameter of the tone component in the current frequency region, an amplitude or energy corresponding to the location of the tone component; and obtaining the reconstructed high frequency band signal based on the location of the tone component in the current frequency region and the amplitude or the energy corresponding to the location of the tone component.

With reference to the second aspect or the foregoing implementations of the second aspect, in an implementation, the determining a location of the tone component in the current frequency region based on the location and quantity parameter of the tone component in the current frequency region includes determining a location parameter of the tone component in the current frequency region based on the location and quantity parameter of the tone component in the current frequency region; and determining the location of the tone component in the current frequency region based on the location parameter of the tone component in the current frequency region.

With reference to the second aspect or the foregoing implementations of the second aspect, in an implementation, the obtaining a reconstructed high frequency band signal of the current frame based on the high frequency band parameter includes determining a location of the tone component in the current frequency region based on the location parameter of the tone component in the current frequency region; determining, based on the amplitude parameter or the energy parameter of the tone component in the current frequency region, an amplitude or energy corresponding to the location of the tone component; and obtaining the reconstructed high frequency band signal based on the location of the tone component in the current frequency region and the amplitude or the energy corresponding to the location of the tone component.

With reference to the second aspect or the foregoing implementations of the second aspect, in an implementation, the location parameter of the tone component in the current frequency region is used to indicate a sequence number of a sub-band in which the tone component included in the current frequency region is located.

With reference to the second aspect or the foregoing implementations of the second aspect, in an implementation, the location of the tone component in the current frequency region is a specified location of a sub-band in which the tone component included in the current frequency region is located.

With reference to the second aspect or the foregoing implementations of the second aspect, in an implementation, the specified location of the sub-band is a central location of the sub-band.

With reference to the second aspect or the foregoing implementations of the second aspect, in an implementation, the obtaining the reconstructed high frequency band signal based on the location of the tone component in the current frequency region and the amplitude or the energy corresponding to the location of the tone component includes determining a frequency domain signal at the location of the tone component according to the following equation:

pSpectralData[tone_pos]=tone_val, where pSpectralData represents the reconstructed high frequency band frequency domain signal in the current frequency region, tone_val represents the amplitude corresponding to the location of the tone component in the current frequency region, and tone_pos represents the location of the tone component in the current frequency region.

According to a third aspect, an audio encoder is provided, including a signal obtaining unit, configured to obtain a current frame of an audio signal, where the current frame includes a high frequency band signal; a parameter obtaining unit, configured to obtain a high frequency band parameter of the current frame based on the high frequency band signal, where the high frequency band parameter is used to indicate a location, a quantity, and an amplitude or energy of a tone component included in the high frequency band signal; and an encoding unit, configured to perform bitstream multiplexing on the high frequency band encoding parameter, to obtain an encoded bitstream.

With reference to the third aspect, in an implementation, the high frequency band parameter includes a location and quantity parameter of the tone component and an amplitude parameter or an energy parameter of the tone component.

With reference to the third aspect or the foregoing implementation of the third aspect, in an implementation, a high frequency band corresponding to the high frequency band signal includes at least one frequency region, and one frequency region includes at least one sub-band; and the parameter obtaining unit is configured to determine a location and quantity parameter of a tone component in a current frequency region in the at least one frequency region and an amplitude parameter or an energy parameter of the tone component in the current frequency region based on a high frequency band signal of the current frequency region.

With reference to the third aspect or the foregoing implementations of the third aspect, in an implementation, the audio encoder further includes a determining unit, configured to determine whether the current frequency region includes a tone component; and the parameter obtaining unit is configured to, when the current frequency region includes a tone component, determine the location and quantity parameter of the tone component in the current frequency region in the at least one frequency region and the amplitude parameter or the energy parameter of the tone component in the current frequency region based on the high frequency band signal of the current frequency region.

With reference to the third aspect or the foregoing implementations of the third aspect, in an implementation, the high frequency band parameter of the current frame further includes tone component indication information, and the tone component indication information is used to indicate whether the current frequency region includes a tone component.

With reference to the third aspect or the foregoing implementations of the third aspect, in an implementation, the parameter obtaining unit is further configured to perform peak search in the current frequency region based on the high frequency band signal of the current frequency region in the at least one frequency region, to obtain at least one of peak quantity information, peak location information, and peak amplitude information of the current region; and determine the location and quantity parameter of the tone component in the current frequency region and the amplitude parameter or the energy parameter of the tone component in the current frequency region based on the at least one of the peak quantity information, the peak location information, and the peak amplitude information of the current frequency region.

With reference to the third aspect or the foregoing implementations of the third aspect, in an implementation, the parameter obtaining unit is configured to perform peak search in the current frequency region based on at least one of a power spectrum, an energy spectrum, or an amplitude spectrum of the current frequency region in the at least one frequency region, to obtain the at least one of the peak quantity information, the peak location information, and the peak amplitude information of the current region.

With reference to the third aspect or the foregoing implementations of the third aspect, in an implementation, the parameter obtaining unit is configured to determine location information, quantity information, and amplitude information of the tone component in the current frequency region based on the at least one of the peak quantity information, the peak location information, and the peak amplitude information of the current frequency region; and determine the location and quantity parameter of the tone component in the current frequency region and the amplitude parameter or the energy parameter of the tone component in the current frequency region based on the location information, the quantity information, and the amplitude information of the tone component in the current frequency region.

With reference to the third aspect or the foregoing implementations of the third aspect, in an implementation, the location and quantity parameter of the tone component in the current frequency region includes N bits, N is a quantity of sub-bands included in the current frequency region, and the N bits are in a one-to-one correspondence with the sub-bands included in the current frequency region; and if a first sub-band included in the current frequency region includes a peak, a value of a bit that is in the N bits and that corresponds to the first sub-band is a first value; or if a second sub-band included in the current frequency region does not include a peak, a value of a bit that is in the N bits and that corresponds to the second sub-band is a second value, where the first value is different from the second value.

With reference to the third aspect or the foregoing implementations of the third aspect, in an implementation, the location and quantity parameter of the tone component in the current frequency region includes N bits, N is a quantity of sub-bands included in the current frequency region, and the N bits are in a one-to-one correspondence with the sub-bands included in the current frequency region; and if a first sub-band included in the current frequency region includes a tone component, a value of a bit that is in the N bits and that corresponds to the first sub-band is a first value; or if a second sub-band included in the current frequency region does not include a tone component, a value of a bit that is in the N bits and that corresponds to the second sub-band is a second value, where the first value is different from the second value.

With reference to the third aspect or the foregoing implementations of the third aspect, in an implementation, the high frequency band parameter further includes a noise floor parameter of the high frequency band signal.

According to a fourth aspect, an audio decoder is provided, including a receiving unit, configured to obtain an encoded bitstream; a demultiplexing unit, configured to perform bitstream demultiplexing on the encoded bitstream, to obtain a high frequency band parameter of a current frame of an audio signal, where the high frequency band parameter is used to indicate a location, a quantity, and an amplitude or energy of a tone component included in a high frequency band signal of the current frame; and a reconstruction unit, configured to obtain a reconstructed high frequency band signal of the current frame based on the high frequency band parameter; and obtain an audio output signal of the current frame based on the reconstructed high frequency band signal of the current frame.

With reference to the fourth aspect, in an implementation, the high frequency band parameter includes a location and quantity parameter of the tone component of the high frequency signal of the current frame and an amplitude parameter or an energy parameter of the tone component.

With reference to the fourth aspect or the foregoing implementation of the fourth aspect, in an implementation, a high frequency band corresponding to the high frequency band signal includes at least one frequency region, and one frequency region includes at least one sub-band; and the location and quantity parameter that is of the tone component of the high frequency signal of the current frame and that is included in the high frequency band parameter includes a location and quantity parameter of a tone component in the at least one frequency region, and the amplitude parameter or the energy parameter of the tone component of the high frequency signal in the current frame includes an amplitude parameter or an energy parameter of the tone component in the at least one frequency region.

With reference to the fourth aspect or the foregoing implementations of the fourth aspect, in an implementation, the demultiplexing unit is configured to obtain a location and quantity parameter of a tone component in a current frequency region in the at least one frequency region; and obtain an amplitude parameter or an energy parameter of the tone component in the current frequency region from the encoded bitstream through parsing based on the location and quantity parameter of the tone component in the current frequency region.

With reference to the fourth aspect or the foregoing implementations of the fourth aspect, in an implementation, the demultiplexing unit is configured to determine a quantity parameter of the tone component in the current frequency region based on the location and quantity parameter of the tone component in the current frequency region; and obtain the amplitude parameter or the energy parameter of the tone component in the current frequency region from the encoded bitstream through parsing based on the quantity parameter of the tone component in the current frequency region.

With reference to the fourth aspect or the foregoing implementations of the fourth aspect, in an implementation, the demultiplexing unit is configured to obtain a location and quantity parameter of a tone component in a current frequency region in the at least one frequency region; determine a location parameter of the tone component in the current frequency region and a quantity parameter of the tone component in the current frequency region based on the location and quantity parameter of the tone component in the current frequency region; and obtain an amplitude parameter or an energy parameter of the tone component in the current frequency region from the encoded bitstream through parsing based on the quantity parameter of the tone component in the current frequency region.

With reference to the fourth aspect or the foregoing implementations of the fourth aspect, in an implementation, the demultiplexing unit is configured to obtain tone component indication information of the current frequency region, where the tone component indication information is used to indicate whether the current frequency region includes a tone component; and when the current frequency region includes a tone component, obtain the location and quantity parameter of the tone component in the current frequency region in the at least one frequency region.

With reference to the fourth aspect or the foregoing implementations of the fourth aspect, in an implementation, the demultiplexing unit is configured to read N bits from the encoded bitstream based on a quantity of sub-bands included in the current frequency region, where the N bits are included in the location and quantity parameter of the tone component in the current frequency region, N is the quantity of sub-bands included in the current frequency region, and the N bits are in a one-to-one correspondence with the sub-bands included in the current frequency region.

With reference to the fourth aspect or the foregoing implementations of the fourth aspect, in an implementation, the demultiplexing unit is configured to determine a location of the tone component in the current frequency region based on the location and quantity parameter of the tone component in the current frequency region; determine, based on the amplitude parameter or the energy parameter of the tone component in the current frequency region, an amplitude or energy corresponding to the location of the tone component; and obtain the reconstructed high frequency band signal based on the location of the tone component in the current frequency region and the amplitude or the energy corresponding to the location of the tone component.

With reference to the fourth aspect or the foregoing implementations of the fourth aspect, in an implementation, the reconstruction unit is configured to determine a location parameter of the tone component in the current frequency region based on the location and quantity parameter of the tone component in the current frequency region; and determine the location of the tone component in the current frequency region based on the location parameter of the tone component in the current frequency region.

With reference to the fourth aspect or the foregoing implementations of the fourth aspect, in an implementation, the reconstruction unit is configured to determine a location of the tone component in the current frequency region based on the location parameter of the tone component in the current frequency region; determine, based on the amplitude parameter or the energy parameter of the tone component in the current frequency region, an amplitude or energy corresponding to the location of the tone component; and obtain the reconstructed high frequency band signal based on the location of the tone component in the current frequency region and the amplitude or the energy corresponding to the location of the tone component.

With reference to the fourth aspect or the foregoing implementations of the fourth aspect, in an implementation, the location parameter of the tone component in the current frequency region is used to indicate a sequence number of a sub-band in which the tone component included in the current frequency region is located.

With reference to the fourth aspect or the foregoing implementations of the fourth aspect, in an implementation, the location of the tone component in the current frequency region is a specified location of a sub-band in which the tone component included in the current frequency region is located.

With reference to the fourth aspect or the foregoing implementations of the fourth aspect, in an implementation, the specified location of the sub-band is a central location of the sub-band.

With reference to the fourth aspect or the foregoing implementations of the fourth aspect, in an implementation, the obtaining the reconstructed high frequency band signal based on the location of the tone component in the current frequency region and the amplitude or the energy corresponding to the location of the tone component includes determining a frequency domain signal at the location of the tone component according to the following equation:

pSpectralData[tone_pos]=tone_val, where pSpectralData represents the reconstructed high frequency band frequency domain signal in the current frequency region, tone_val represents the amplitude corresponding to the location of the tone component in the current frequency region, and tone_pos represents the location of the tone component in the current frequency region.

According to a fifth aspect, an embodiment of this application provides a computer-readable storage medium. The computer-readable storage medium stores instructions, and when the instructions are run on a computer, the computer is enabled to perform the method in the first aspect or the second aspect.

According to a sixth aspect, an embodiment of this application provides a computer program product including instructions. When the computer program product is run on a computer, the computer is enabled to perform the method in the first aspect or the second aspect.

According to a seventh aspect, an embodiment of this application provides an audio encoder, including a processor and a memory. The memory is configured to store instructions, and the processor is configured to execute the instructions in the memory, so that the audio encoder performs the method in the first aspect.

According to an eighth aspect, an embodiment of this application provides an audio decoder, including a processor and a memory. The memory is configured to store instructions, and the processor is configured to execute the instructions in the memory, so that the audio decoder performs the method in the second aspect.

According to a ninth aspect, an embodiment of this application provides a communications apparatus. The communications apparatus may include an entity such as an audio encoding and decoding device or a chip. The communications apparatus includes a processor. Optionally, the communications apparatus further includes a memory. The memory is configured to store instructions, and the processor is configured to execute the instructions in the memory, so that the communications apparatus performs the method in the first aspect or the second aspect.

According to a tenth aspect, this application provides a chip system. The chip system includes a processor, configured to support an audio encoding and decoding device to implement functions in the foregoing aspects, for example, sending or processing data and/or information in the foregoing methods. In a possible design, the chip system further includes a memory, and the memory is configured to store program instructions and data that are necessary for an audio encoding and decoding device. The chip system may include a chip, or may include a chip and another discrete component.

From the foregoing descriptions, in the embodiments of the present disclosure, the audio encoder encodes the location, the quantity, and the amplitude or the energy of the tone component in the high frequency band signal, so that the audio decoder recovers the tone component based on the location, the quantity, and the amplitude or the energy of the tone component. Therefore, the location and the energy of the recovered tone component are more accurate, thereby improving quality of a decoded signal.

DESCRIPTION OF EMBODIMENTS

The following describes the embodiments of this application with reference to accompanying drawings.

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "have", and any other variants mean to cover the non-exclusive inclusion, so that a process, method, system, product, or device that includes a series of units is not necessarily limited to those units, but may include other units not expressly listed or inherent to such a process, method, system, product, or device.

An audio signal in the embodiments of this application is an input signal in an audio encoding device, and the audio signal may include a plurality of frames. For example, a current frame may be a frame in the audio signal. In the embodiments of this application, an example of encoding and decoding the audio signal of the current frame is used for description. A frame before or after the current frame in the audio signal may be correspondingly encoded and decoded according to an encoding and decoding mode of the audio signal of the current frame. An encoding and decoding process of the frame before or after the current frame in the audio signal is not described. In addition, the audio signal in the embodiments of this application may be a mono audio signal, or may be a stereo signal. The stereo signal may be an original stereo signal, or may be a stereo signal formed by two channels of signals (a left-channel signal and a right-channel signal) included in a multi-channel signal, or may be a stereo signal formed by two channels of signals generated by at least three channels of signals included in a multi-channel signal. This is not limited in the embodiments of this application.

Figure 1:
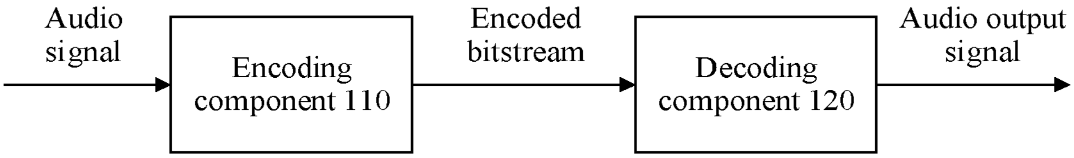
FIG. 1 is a schematic diagram of a structure of an audio encoding and decoding system according to an embodiment of this application.

FIG. 1 is a schematic diagram of a structure of an audio encoding and decoding system according to an example embodiment of this application. The audio encoding and decoding system includes an encoding component 110 and a decoding component 120.

The encoding component 110 is configured to encode a current frame (an audio signal) in frequency domain or time domain. Optionally, the encoding component 110 may be implemented by software, or may be implemented by hardware, or may be implemented in a form of a combination of software and hardware. This is not limited in this embodiment of this application.

Figure 2:
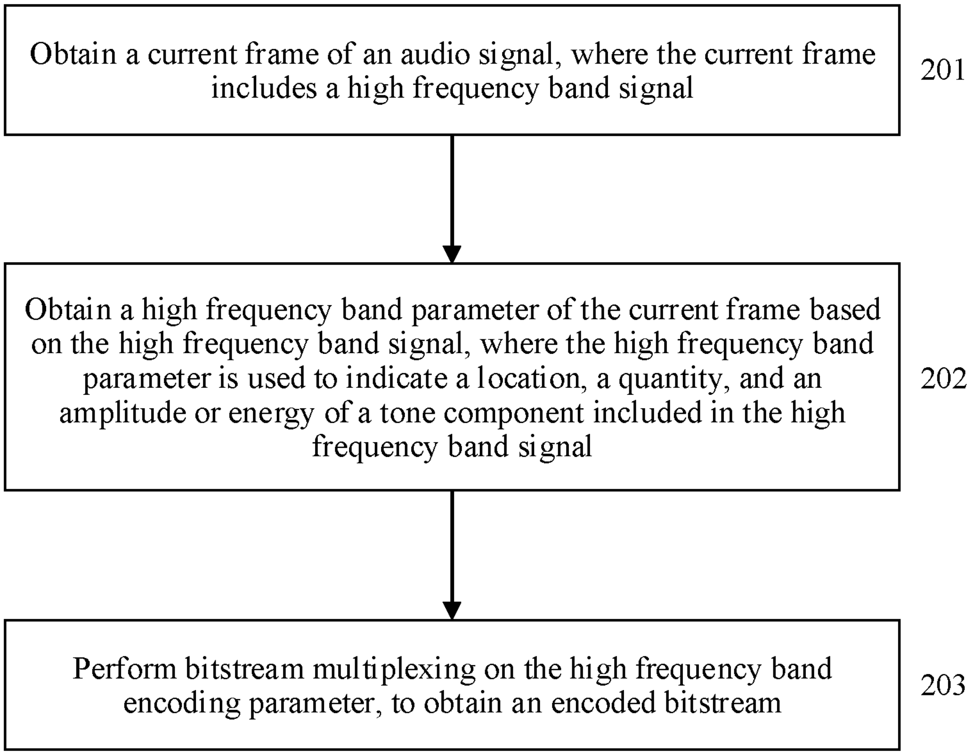
FIG. 2 is a schematic flowchart of an audio encoding method according to an embodiment of this application.

When the encoding component 110 encodes the current frame in frequency domain or time domain, in a possible implementation, steps shown in FIG. 2 may be included.

In this embodiment of this application, after completing encoding, the encoding component 110 may generate an encoded bitstream, and the encoding component 110 may send the encoded bitstream to the decoding component 120, so that the decoding component 120 can receive the encoded bitstream. Then, the decoding component 120 obtains an audio output signal from the encoded bitstream.

It should be noted that an encoding method shown in FIG. 2 is merely an example rather than a limitation. An execution sequence of steps in FIG. 2 is not limited in this embodiment of this application. The encoding method shown in FIG. 2 may alternatively include more or fewer steps. This is not limited in this embodiment of this application.

Optionally, the encoding component 110 may be connected to the decoding component 120 wiredly or wirelessly. The decoding component 120 may obtain, by using the connection between the decoding component 120 and the encoding component 110, an encoded bitstream generated by the encoding component 110. Alternatively, the encoding component 110 may store the generated encoded bitstream in a memory, and the decoding component 120 reads the encoded bitstream in the memory.

Optionally, the decoding component 120 may be implemented by software, or may be implemented by hardware, or may be implemented in a form of a combination of software and hardware. This is not limited in this embodiment of this application.

Figure 3:
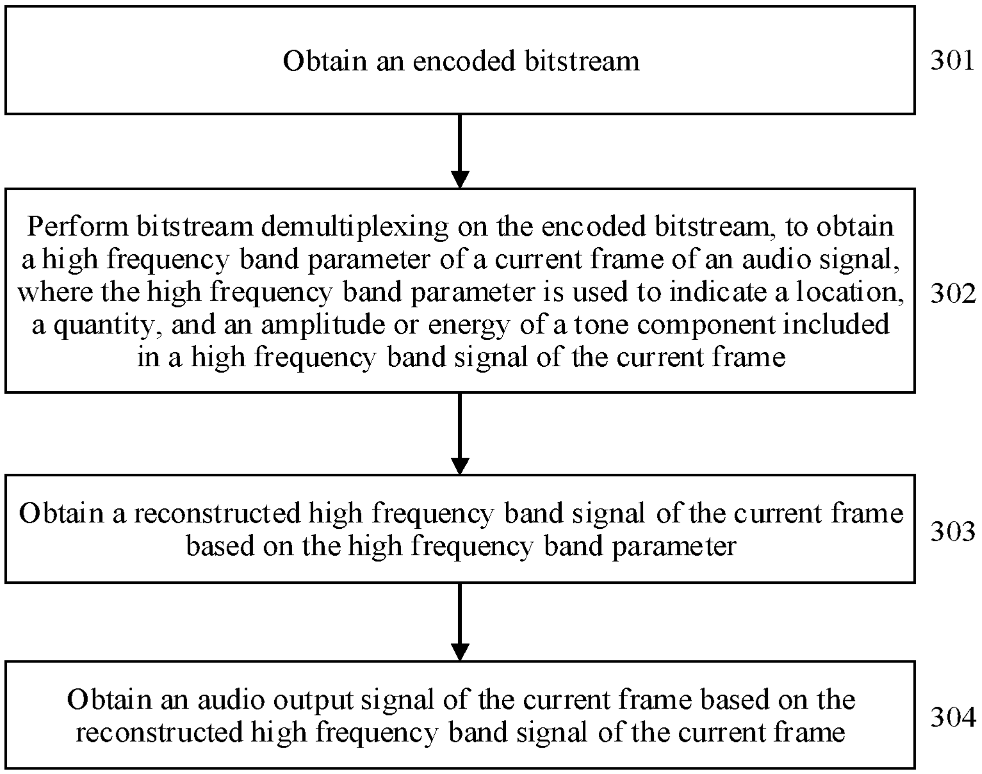
FIG. 3 is a schematic flowchart of an audio decoding method according to an embodiment of this application.

When the decoding component 120 decodes a current frame (an audio signal) in frequency domain or time domain, in a possible implementation, steps shown in FIG. 3 may be included.

Optionally, the encoding component 110 and the decoding component 120 may be disposed in a same device, or may be disposed in different devices. The device may be a terminal having an audio signal processing function, such as a mobile phone, a tablet computer, a laptop computer, a desktop computer, a Bluetooth speaker, a pen recorder, or a wearable device. Alternatively, the device may be a network element having an audio signal processing capability in a core network or a wireless network. This is not limited in this embodiment.

Figure 4:
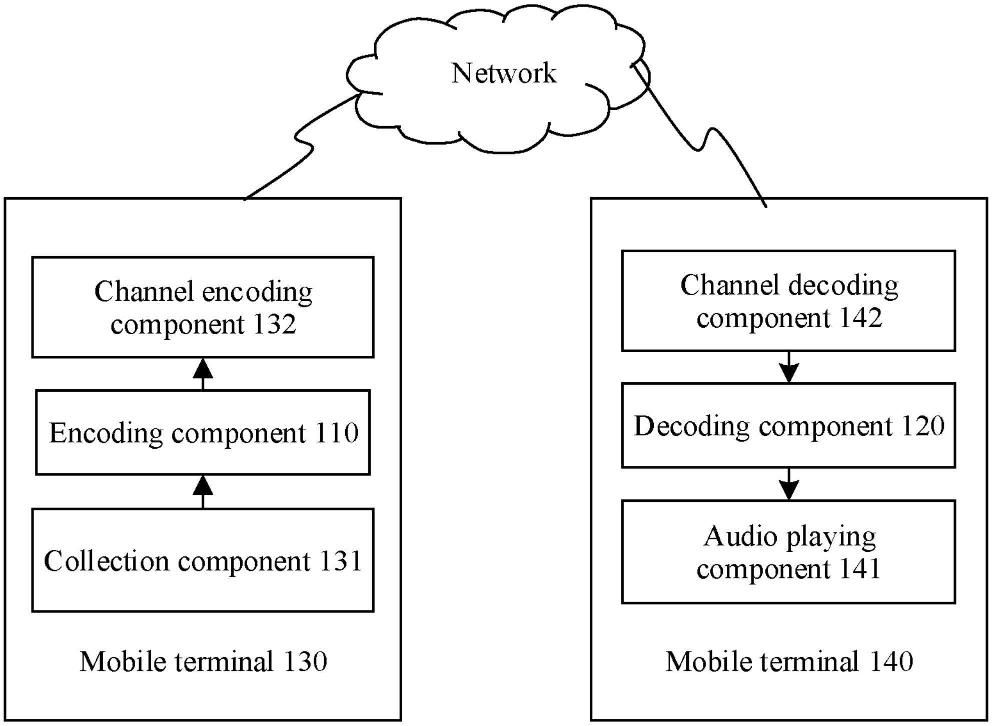
FIG. 4 is a schematic diagram of a mobile terminal according to an embodiment of this application.

For example, as shown in FIG. 4, the following example is used for description in this embodiment. The encoding component 110 is disposed in a mobile terminal 130, and the decoding component 120 is disposed in a mobile terminal 140. The mobile terminal 130 and the mobile terminal 140 are mutually independent electronic devices having an audio signal processing capability. For example, the mobile terminal 130 and the mobile terminal 140 may be mobile phones, wearable devices, virtual reality (VR) devices, or augmented reality (AR) devices. In addition, the mobile terminal 130 and the mobile terminal 140 are connected by using a wireless or wired network.

Optionally, the mobile terminal 130 may include a collection component 131, an encoding component 110, and a channel encoding component 132. The collection component 131 is connected to the encoding component 110, and the encoding component 110 is connected to the encoding component 132.

Optionally, the mobile terminal 140 may include an audio playing component 141, the decoding component 120, and a channel decoding component 142, where the audio playing component 141 is connected to the decoding component 120, and the decoding component 120 is connected to the channel decoding component 142.

After collecting an audio signal through the collection component 131, the mobile terminal 130 encodes the audio signal by using the encoding component 110, to obtain an encoded bitstream; and then encodes the encoded bitstream by using the channel encoding component 132, to obtain a transmission signal.

The mobile terminal 130 sends the transmission signal to the mobile terminal 140 through the wireless or wired network.

After receiving the transmission signal, the mobile terminal 140 decodes the transmission signal by using the channel decoding component 142, to obtain the encoded bitstream; decodes the encoded bitstream by using the decoding component 110, to obtain the audio signal; and plays the audio signal by using the audio playing component. It may be understood that the mobile terminal 130 may alternatively include the components included in the mobile terminal 140, and the mobile terminal 140 may alternatively include the components included in the mobile terminal 130.

Figure 5:
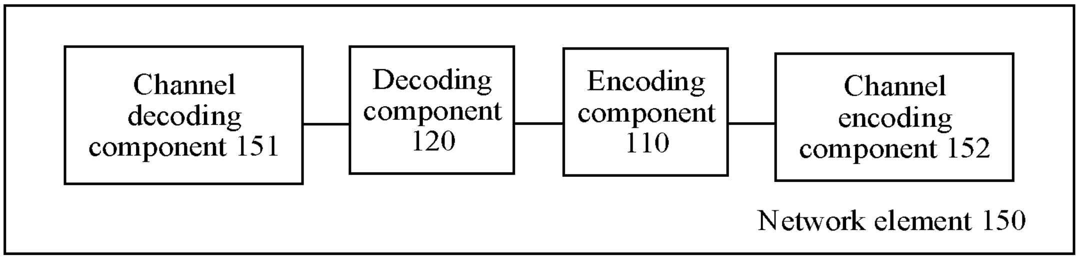
FIG. 5 is a schematic diagram of a network element according to an embodiment of this application.

For example, as shown in FIG. 5, the following example is used for description. The encoding component 110 and the decoding component 120 are disposed in one network element 150 having an audio signal processing capability in a core network or wireless network.

Optionally, the network element 150 includes a channel decoding component 151, the decoding component 120, the encoding component 110, and a channel encoding component 152. The channel decoding component 151 is connected to the decoding component 120, the decoding component 120 is connected to the encoding component 110, and the encoding component 110 is connected to the channel encoding component 152.

After receiving a transmission signal sent by another device, the channel decoding component 151 decodes the transmission signal to obtain a first encoded bitstream. The decoding component 120 decodes the encoded bitstream to obtain an audio signal. The encoding component 110 encodes the audio signal to obtain a second encoded bitstream. The channel encoding component 152 encodes the second encoded bitstream to obtain the transmission signal.

The other device may be a mobile terminal having an audio signal processing capability, or may be another network element having an audio signal processing capability. This is not limited in this embodiment.

Optionally, the encoding component 110 and the decoding component 120 in the network element may transcode an encoded bitstream sent by a mobile terminal.

Optionally, in this embodiment of this application, a device on which the encoding component 110 is installed may be referred to as an audio encoding device. In actual implementation, the audio encoding device may also have an audio decoding function. This is not limited in this embodiment of this application.

Optionally, in this embodiment of this application, a device on which the decoding component 120 is installed may be referred to as an audio decoding device. In actual implementation, the audio decoding device may also have an audio encoding function. This is not limited in this embodiment of this application.

FIG. 2 describes a procedure of an audio encoding method according to an embodiment of the present disclosure.

201: Obtain a current frame of an audio signal, where the current frame includes a high frequency band signal.

The current frame may be any frame in the audio signal, and the current frame may include a high frequency band signal and a low frequency band signal. Division of a high frequency band signal and a low frequency band signal may be determined by using a frequency band threshold, a signal higher than the frequency band threshold is a high frequency band signal, and a signal lower than the frequency band threshold is a low frequency band signal. The frequency band threshold may be determined based on a transmission bandwidth and data processing capabilities of the encoding component 110 and the decoding component 120. This is not limited herein.

The high frequency band signal and the low frequency band signal are relative. For example, a signal lower than a frequency is a low frequency band signal, but a signal higher than the frequency is a high frequency band signal (a signal corresponding to the frequency may be a low frequency band signal or a high frequency band signal). The frequency varies with a bandwidth of the current frame. For example, when the current frame is a wideband signal of 0 to 8 kHz, the frequency may be 4 kHz. When the current frame is an ultra-wideband signal of 0 to 16 kHz, the frequency may be 8 kHz.

202: Obtain a high frequency band parameter of the current frame based on the high frequency band signal, where the high frequency band parameter is used to indicate a location, a quantity, and an amplitude or energy of a tone component included in the high frequency band signal.

In an example, the high frequency band parameter includes a location and quantity parameter of the tone component and an amplitude parameter or an energy parameter of the tone component. The location and quantity parameter indicate that one parameter indicates a location of a tone component and a quantity of tone components. In another implementation, the high frequency band parameter includes a location parameter of a tone component, a quantity parameter of the tone component, and an amplitude parameter or an energy parameter of the tone component. In this case, different parameters are used to indicate a location of a tone component and a quantity of tone components.

In a specific implementation, a high frequency band corresponding to the high frequency band signal includes at least one frequency region (Tile), one frequency region includes at least one sub-band, and the obtaining a high frequency band parameter of the current frame based on the high frequency band signal includes determining a location and quantity parameter of a tone component in a current frequency region in the at least one frequency region and an amplitude parameter or an energy parameter of the tone component in the current frequency region based on a high frequency band signal of the current frequency region.

In another implementation, before the determining a location and quantity parameter of a tone component in a current frequency region in the at least one frequency region and an amplitude parameter or an energy parameter of the tone component in the current frequency region based on a high frequency band signal of the current frequency region, the method includes determining whether the current frequency region includes a tone component; and when the current frequency region includes a tone component, determining the location and quantity parameter of the tone component in the current frequency region in the at least one frequency region and the amplitude parameter or the energy parameter of the tone component in the current frequency region based on the high frequency band signal of the current frequency region. Therefore, only a parameter of a frequency region including a tone component is obtained, thereby improving encoding efficiency.

Correspondingly, the high frequency band parameter of the current frame further includes tone component indication information, and the tone component indication information is used to indicate whether the current frequency region includes a tone component. In this way, an audio decoder can perform decoding according to the indication information, thereby improving decoding efficiency.

In an implementation, the determining a location and quantity parameter of a tone component in a current frequency region in the at least one frequency region and an amplitude parameter or an energy parameter of the tone component in the current frequency region based on a high frequency band signal of the current frequency region includes performing peak search in the current frequency region based on the high frequency band signal of the current frequency region in the at least one frequency region, to obtain at least one of peak quantity information, peak location information, and peak amplitude information of the current region; and determining the location and quantity parameter of the tone component in the current frequency region and the amplitude parameter or the energy parameter of the tone component in the current frequency region based on the at least one of the peak quantity information, the peak location information, and the peak amplitude information of the current frequency region.

The high frequency band signal used to perform peak search may be a frequency domain signal, or may be a time domain signal.

In an example, in an implementation, peak search may be performed based on at least one of a power spectrum, an energy spectrum, or an amplitude spectrum of the current frequency region.

In an implementation, the determining the location and quantity parameter of the tone component in the current frequency region and the amplitude parameter or the energy parameter of the tone component in the current frequency region based on the at least one of the peak quantity information, the peak location information, and the peak amplitude information of the current frequency region includes determining location information, quantity information, and amplitude information of the tone component in the current frequency region based on the at least one of the peak quantity information, the peak location information, and the peak amplitude information of the current frequency region; and determining the location and quantity parameter of the tone component in the current frequency region and the amplitude parameter or the energy parameter of the tone component in the current frequency region based on the location information, the quantity information, and the amplitude information of the tone component in the current frequency region.

203: Perform bitstream multiplexing on the high frequency band encoding parameter, to obtain an encoded bitstream.

In an implementation, the location and quantity parameter of the tone component in the current frequency region includes N bits, N is a quantity of sub-bands included in the current frequency region, and the N bits are in a one-to-one correspondence with the sub-bands included in the current frequency region; and if a first sub-band included in the current frequency region includes a peak, a value of a bit that is in the N bits and that corresponds to the first sub-band is a first value; or if a second sub-band included in the current frequency region does not include a peak, a value of a bit that is in the N bits and that corresponds to the second sub-band is a second value, where the first value is different from the second value.

In an implementation, the location and quantity parameter of the tone component in the current frequency region includes N bits, N is a quantity of sub-bands included in the current frequency region, and the N bits are in a one-to-one correspondence with the sub-bands included in the current frequency region; and if a first sub-band included in the current frequency region includes a tone component, a value of a bit that is in the N bits and that corresponds to the first sub-band is a first value; or if a second sub-band included in the current frequency region does not include a tone component, a value of a bit that is in the N bits and that corresponds to the second sub-band is a second value, where the first value is different from the second value.

In an implementation, the high frequency band parameter further includes a noise floor parameter of the high frequency band signal.

In another embodiment of the present disclosure, an audio encoding method may include the following procedure.

1. Obtain a high frequency band signal of an audio signal.

2. Determine a high frequency band parameter based on the high frequency band signal. The following four cases may be included.

Case 1: The high frequency band parameter includes a location parameter, a quantity parameter, and an amplitude parameter of a tone component.

Determining a high frequency band parameter based on the high frequency band signal may be as follows.

A power spectrum of the high frequency band signal is first obtained based on the high frequency band signal.

Then, peak search is performed based on the power spectrum of the high frequency band signal, to obtain peak quantity information, peak location information, and peak amplitude information. There are many peak search manners, and a specific peak search manner is not limited in this embodiment of the present disclosure. For example, if a value of a power spectrum corresponding to a current frequency differs greatly from values of power spectrums corresponding to left and right neighboring frequencies, the frequency is a peak.

Then, screening is performed based on at least one of the peak location, the peak amplitude, and the peak quantity, to determine the location parameter, the quantity parameter, and the amplitude parameter of the tone component.

For example, performing screening based on the peak amplitude may be using a case in which the peak amplitude is greater than a preset threshold as a preset condition.

In an example, a peak quantity meeting the preset condition may be used as the quantity parameter of the tone component.

A corresponding peak location is used as the location parameter of the tone component, or the location parameter of the tone component is determined based on the corresponding peak location. For example, a sub-band sequence number corresponding to the peak location is obtained based on the corresponding peak location, and the sub-band sequence number corresponding to the peak location is used as the location parameter of the tone component.

A corresponding peak amplitude is used as the amplitude parameter of the tone component, or the amplitude parameter of the tone component is determined based on a corresponding peak amplitude. The peak amplitude may be represented by energy of the frequency domain signal, or may be represented by power of the frequency domain signal. The amplitude parameter of the tone component may be replaced with an energy parameter of the tone component, to serve as the high frequency band parameter.

If a high frequency band is divided into K frequency regions (tile) in an encoding process, each frequency region is further divided into N sub-bands. The high frequency band parameter may alternatively be determined based on the high frequency band signal in each frequency region. Herein, both K and N are integers greater than or equal to 1.

Case 2: The high frequency band parameter includes a location and quantity parameter and an amplitude parameter of a tone component.

A high frequency band may be divided into K frequency regions (tile) in an encoding process, and each frequency region is further divided into N sub-bands. The high frequency band parameter may be determined based on a frequency region. Herein, one frequency region is used as an example. A method for determining a high frequency band parameter based on the high frequency band signal may be as follows.

A power spectrum of the high frequency band signal is first obtained based on the high frequency band signal.

Then, peak search is performed based on the power spectrum of the high frequency band signal, to obtain peak quantity information, peak location information, and peak amplitude information.

Peak search is performed based on a frequency region. Peak search is performed on a power spectrum of a high frequency band signal in a frequency region, to obtain peak quantity information, peak location information, and peak amplitude information in the frequency region.

Screening is performed based on at least one of the peak location, the peak amplitude, and the peak quantity, to determine the location and quantity parameter and the amplitude parameter of the tone component.

Screening is performed based on at least one of the peak location, the peak amplitude, and the peak quantity, to determine a location parameter, a quantity parameter, and the amplitude parameter of the tone component.

The location parameter of the tone component may be a sequence number of a sub-band in which a peak exists in the frequency region. The quantity parameter of the tone component is a quantity of sub-bands in which a peak exists in the frequency region. The amplitude parameter of the tone component may be equal to a peak amplitude of a sub-band in which a peak exists in the frequency region, or may be calculated based on a peak amplitude of a sub-band in which a peak exists in the frequency region. The peak amplitude may be represented by energy of the frequency domain signal, or may be represented by power of the frequency domain signal. The amplitude parameter of the tone component may be replaced with an energy parameter of the tone component, to serve as the high frequency band parameter.

The location and quantity parameter of the tone component is determined based on the location parameter of the tone component.

The location and quantity parameter of the tone component may be represented by an N-bit sequence, and N is a quantity of sub-bands in a frequency region. In a possible case, a bit sequence from a low-order bit to a high-order bit indicates sequence numbers of sub-bands in ascending order. In another possible case, a bit sequence from a low-order bit to a high-order bit indicates sequence numbers of sub-bands in descending order. In addition, a sequence number of a sub-band corresponding to each bit in the bit sequence may be further specified in advance.

It is determined, based on a sequence number of a sub-band in which a peak exists in the frequency region, whether a peak exists in a sub-band corresponding to each bit in an N-bit bit sequence, to obtain the N-bit bit sequence, that is, the location and quantity parameter of the tone component. If the sequence number of the sub-band corresponding to the bit is equal to the sequence number of the sub-band in which a peak exists in the frequency region, a value of the bit is 1, or otherwise, the value of the bit is 0.

For example, a quantity of sub-bands in a frequency region is 5, the location and quantity parameter of the tone component is represented by a 5-bit bit sequence, and a binary representation of a value of the 5-bit bit sequence is 10011. Assuming that the 5-bit bit sequence from a low-order bit to a high-order bit indicates sequence numbers of sub-bands in ascending order, the value of the bit sequence indicates that a peak exists in a sub-band 0, a sub-band 1, and a sub-band 4 in the frequency region, that is, the sequence numbers of the sub-bands in which a peak exists are 0, 1, and 4.

Case 3: The high frequency band parameter may further include a noise floor parameter. Case 3 may be implemented with reference to Case 1 or Case 2.

The determining a high frequency band parameter based on the high frequency band signal may further include the following.

A power spectrum estimation value of a noise floor is obtained based on the power spectrum of the high frequency band signal.

A to-be-encoded noise floor parameter is obtained based on the power spectrum estimation value of the noise floor.

Quantization encoding is performed on the to-be-encoded noise floor parameter, to obtain the noise floor parameter.

Case 4: The high frequency band parameter may further include signal type information. Case 4 may be implemented with reference to Case 1 to Case 3.

The determining a high frequency band parameter based on the high frequency band signal further includes determining the signal type information based on the quantity parameter of the tone component or the location and quantity parameter of the tone component. Details are as follows.

The signal type information is determined based on the quantity parameter of the tone component. For example, if a value of the quantity parameter of the tone component is greater than 0, the signal type information indicates a tone signal type.

The signal type information is determined based on the location and quantity parameter of the tone component. The quantity parameter of the tone component may be obtained based on the location and quantity parameter of the tone component, and the signal type information may be determined based on the quantity parameter of the tone component. It should be noted that, if the quantity parameter of the tone component has been obtained when the location and quantity parameter of the tone component is determined, the quantity parameter of the tone component does not need to be obtained based on the location and quantity parameter of the tone component, and the signal type information may be directly determined based on the quantity parameter of the tone component.

The signal type information may be represented by a flag indicating whether a tone component exists. The flag indicating whether a tone component exists may also be referred to as tone component indication information.

For example, when a value of the flag indicating whether a tone component exists is 1, it indicates that a tone component exists.

If encoding is performed based on a frequency region, the signal type information also needs to be determined based on the frequency region. The signal type information may be represented by a flag indicating whether a tone component exists in a frequency region. For example, when a value of the flag indicating whether a tone component exists in the frequency region is 1, it indicates that a tone component exists in the frequency region.

3. Perform bitstream multiplexing on the high frequency band parameter, to obtain an encoded bitstream.

Special processing for Case 4: If the signal type information indicates a tone signal type, the signal type information and the high frequency band parameter other than the signal type information need to be written into the bitstream. Otherwise, the signal type information is written into the bitstream. If encoding is performed based on frequency regions, the frequency regions are processed in sequence where if a signal type information corresponding to the frequency region indicates a tone signal type, the signal type information and the high frequency band parameter other than the signal type information need to be written into the bitstream. Otherwise, the signal type information is written into the bitstream.

It can be learned from the foregoing descriptions that, in this embodiment of the present disclosure, an audio encoder encodes the location, the quantity, and the amplitude or the energy of the tone component in the high frequency band signal, so that the audio decoder recovers the tone component based on the location, the quantity, and the amplitude or the energy of the tone component. Therefore, the location and the energy of the recovered tone component are more accurate, thereby improving quality of a decoded signal.

FIG. 3 describes a procedure of an audio decoding method according to an embodiment of the present disclosure, including the following.

301: Obtain an encoded bitstream.

302: Perform bitstream demultiplexing on the encoded bitstream, to obtain a high frequency band parameter of a current frame of an audio signal, where the high frequency band parameter is used to indicate a location, a quantity, and an amplitude or energy of a tone component included in a high frequency band signal of the current frame.

In an example, the high frequency band parameter includes a location and quantity parameter of the tone component and an amplitude parameter or an energy parameter of the tone component. The location and quantity parameter indicate that one parameter indicates a location of a tone component and a quantity of tone components. In another implementation, the high frequency band parameter includes a location parameter of a tone component, a quantity parameter of the tone component, and an amplitude parameter or an energy parameter of the tone component. In this case, different parameters are used to indicate a location of a tone component and a quantity of tone components.

In an implementation, a high frequency band corresponding to the high frequency band signal includes at least one frequency region, and one frequency region includes at least one sub-band. Correspondingly, the location and quantity parameter that is of the tone component of the high frequency signal of the current frame and that is included in the high frequency band parameter includes a location and quantity parameter of a tone component in the at least one frequency region, and the amplitude parameter or the energy parameter of the tone component of the high frequency signal in the current frame includes an amplitude parameter or an energy parameter of the tone component in the at least one frequency region.

In an implementation, the performing bitstream demultiplexing on the encoded bitstream, to obtain a high frequency band parameter of a current frame of an audio signal includes obtaining a location and quantity parameter of a tone component in a current frequency region in the at least one frequency region; and obtaining an amplitude parameter or an energy parameter of the tone component in the current frequency region from the encoded bitstream through parsing based on the location and quantity parameter of the tone component in the current frequency region.

In an implementation, the obtaining an amplitude parameter or an energy parameter of the tone component in the current frequency region from the encoded bitstream through parsing based on the location and quantity parameter of the tone component in the current frequency region includes determining a quantity parameter of the tone component in the current frequency region based on the location and quantity parameter of the tone component in the current frequency region; and obtaining the amplitude parameter or the energy parameter of the tone component in the current frequency region from the encoded bitstream through parsing based on the quantity parameter of the tone component in the current frequency region.

In an implementation, the performing bitstream demultiplexing on the encoded bitstream, to obtain a high frequency band parameter of a current frame of an audio signal includes obtaining a location and quantity parameter of a tone component in a current frequency region in the at least one frequency region; determining a location parameter of the tone component in the current frequency region and a quantity parameter of the tone component in the current frequency region based on the location and quantity parameter of the tone component in the current frequency region; and obtaining an amplitude parameter or an energy parameter of the tone component in the current frequency region from the encoded bitstream through parsing based on the quantity parameter of the tone component in the current frequency region.

In an implementation, the obtaining a location and quantity parameter of a tone component in a current frequency region in the at least one frequency region includes obtaining tone component indication information of the current frequency region, where the tone component indication information is used to indicate whether the current frequency region includes a tone component; and when the current frequency region includes a tone component, obtaining the location and quantity parameter of the tone component in the current frequency region in the at least one frequency region. Therefore, only a parameter of a tone component in a frequency region including a tone component can be decoded, thereby improving decoding efficiency.

In an implementation, the obtaining a reconstructed high frequency band signal of the current frame based on the high frequency band parameter includes determining a location of the tone component in the current frequency region based on the location parameter of the tone component in the current frequency region; determining, based on the amplitude parameter or the energy parameter of the tone component in the current frequency region, an amplitude or energy corresponding to the location of the tone component; and obtaining the reconstructed high frequency band signal based on the location of the tone component in the current frequency region and the amplitude or the energy corresponding to the location of the tone component.

In an example, the determining a location of the tone component in the current frequency region based on the location and quantity parameter of the tone component in the current frequency region may include determining a location parameter of the tone component in the current frequency region based on the location and quantity parameter of the tone component in the current frequency region; and determining the location of the tone component in the current frequency region based on the location parameter of the tone component in the current frequency region.

303: Obtain a reconstructed high frequency band signal of the current frame based on the high frequency band parameter.

In an implementation, the obtaining a reconstructed high frequency band signal of the current frame based on the high frequency band parameter may include determining a location of the tone component in the current frequency region based on the location parameter of the tone component in the current frequency region; determining, based on the amplitude parameter or the energy parameter of the tone component in the current frequency region, an amplitude or energy corresponding to the location of the tone component; and obtaining the reconstructed high frequency band signal based on the location of the tone component in the current frequency region and the amplitude or the energy corresponding to the location of the tone component.

In an example, the reconstructed high frequency band signal may be obtained based on the location of the tone component in the current frequency region and the amplitude corresponding to the location of the tone component in the following manner.

A frequency domain signal at the location of the tone component is determined according to the following equation:

pSpectralData[tone_pos]=tone_val where pSpectralData represents the reconstructed high frequency band frequency domain signal in the current frequency region, tone_val represents the amplitude corresponding to the location of the tone component in the current frequency region, and tone_pos represents the location of the tone component in the current frequency region.

304: Obtain an audio output signal of the current frame based on the reconstructed high frequency band signal of the current frame.

In an embodiment, the location and quantity parameter of the tone component in the current frequency region includes N bits. Correspondingly, the obtaining a location and quantity parameter of a tone component in a current frequency region in the at least one frequency region includes reading N bits from the encoded bitstream based on a quantity of sub-bands included in the current frequency region, where the N bits are included in the location and quantity parameter of the tone component in the current frequency region, N is the quantity of sub-bands included in the current frequency region, and the N bits are in a one-to-one correspondence with the sub-bands included in the current frequency region.

In an implementation, the location parameter of the tone component in the current frequency region is used to indicate a sequence number of a sub-band in which the tone component included in the current frequency region is located.

In an implementation, the location of the tone component in the current frequency region is a specified location of a sub-band in which the tone component included in the current frequency region is located. For example, the specified location of the sub-band may be a central location of the sub-band, a start location of the sub-band, or an end location of the sub-band.

Another embodiment of the present disclosure provides an audio decoding method, including the following procedure.

1. Obtain an encoded bitstream.

2. Obtain a high frequency band parameter based on the encoded bitstream.

A high frequency band may be divided into K frequency regions (tile), and each frequency region is further divided into N sub-bands. The high frequency band parameter may be determined based on a frequency region. The following uses a method for obtaining a high frequency band parameter based on an encoded bitstream in a frequency region as an example. Methods for obtaining a high frequency band parameter based on an encoded bitstream in different frequency regions may be the same or may be different.

Case 1: The high frequency band parameter may be obtained by using the following procedure:

The bitstream is parsed to determine a location parameter, a quantity parameter, and an amplitude parameter of a tone component.

The bitstream is parsed to determine the quantity parameter of the tone component.

The bitstream is parsed based on the quantity parameter of the tone component, to determine the location parameter of the tone component.

The bitstream is parsed based on the quantity parameter of the tone component, to determine the amplitude parameter of the tone component.

Case 2: The high frequency band parameter may be obtained by using the following procedure:

The bitstream is parsed to determine a location and quantity parameter of a tone component.

The location and quantity parameter of the tone component represents location information of the tone component and quantity information of the tone component. A decoder side parses the bitstream to first obtain the location and quantity parameter of the tone component. The location and quantity parameter of the tone component may be represented by an N-bit sequence, and N is a quantity of sub-bands in a frequency region.

In an example, a quantity num_subband of sub-bands in the frequency region is first determined based on a frequency domain resolution. Then, num_subband bits are read from the bitstream based on the quantity num_subband of sub-bands in the frequency region, that is, the location and quantity parameter of the tone component.

The frequency domain resolution tone_res[p] may be preset, or may be obtained by parsing the obtained encoded bitstream. Assuming that a bandwidth of a $p^{th}$ frequency region is tile_width[p], a quantity of sub-bands in the frequency region may be num_subband=tile_width[p]/tone_res[p].

For example, the quantity of sub-bands in the frequency region is 5, and five bits are read from the bitstream. A binary representation of the obtained location and quantity parameter of the tone component is 10011.

The quantity num_subband of sub-bands in the frequency region may alternatively be preset, and the num_subband bits may be read from the bitstream directly based on the quantity num_subband of sub-bands in the frequency region, that is, the location and quantity parameter of the tone component.

The bitstream is parsed to determine an amplitude parameter of the tone component.

First, a quantity parameter of the tone component is obtained based on the location and quantity parameter of the tone component.

In an example, a quantity of sub-bands in which a tone component exists in the frequency region may be determined based on the location and quantity parameter of the tone component, that is, the quantity parameter tone_cnt[p] of the tone component. The quantity of sub-bands in which a tone component exists in the frequency region is equal to a quantity of bits whose values are 1 in the binary representation of the location and quantity parameter of the tone component.

For example, the binary representation of the location and quantity parameter of the tone component is 10011. In this case, the quantity of sub-bands in which a tone component exists in the frequency region is equal to 3, that is, the quantity parameter tone_cnt[p] of the tone component is equal to 3.

In an example, 0 may also be used to indicate that a tone component exists in a sub-band. In this case, when the binary representation of the location and quantity parameter of the tone component is 10011, the quantity of sub-bands in which a tone component exists in the frequency region is equal to 2, that is, the quantity parameter tone_cnt[p] of the tone component is equal to 2.

Then, the bitstream is parsed based on the quantity parameter of the tone component, to determine the amplitude parameter of the tone component.

In an example, the amplitude parameter of the tone component may be obtained by parsing the bitstream sequentially based on a preset quantity of bits, and a quantity of amplitude parameters of the tone component is equal to the quantity parameter of the tone component, that is, the amplitude parameter of the tone component tone_val_q[p][i], where i=0, . . . , tone_cnt[p]−1.

Case 3: The high frequency band parameter may further include a noise floor parameter of a tone component. The obtaining a high frequency band parameter based on the encoded bitstream further includes parsing the bitstream to determine the noise floor parameter. In an example, the noise floor parameter noise_floor[p] may be obtained by parsing the bitstream based on a preset quantity of bits.

Case 4: The high frequency band parameter further includes signal class information. The obtaining a high frequency band parameter based on the encoded bitstream further includes parsing the bitstream to determine the signal class information.

The obtaining a high frequency band parameter based on the encoded bitstream may be as follows.

The bitstream is parsed to determine the signal class information.

The signal class information may be a flag indicating whether a tone component exists in the frequency region, and may also be referred to as tone component indication information.

It is determined, based on the signal class information, whether a high frequency band parameter other than the signal class information needs to be decoded.

If a value of the flag indicating whether a tone component exists in the frequency region is 1, that is, the signal class information indicates a tone signal type, the bitstream continues to be parsed.

The bitstream is parsed to determine a high frequency band parameter other than the signal class information.

A method for parsing the bitstream to determine a high frequency band parameter other than the signal class information may be any one of Case 1, Case 2, and Case 3 on the decoder side.

3. Obtain a reconstructed high frequency band signal based on the high frequency band parameter.

A high frequency band may be divided into K frequency regions (tile), and each frequency region is further divided into N sub-bands. The high frequency band signal may be reconstructed based on a frequency region. The following uses a method for obtaining a reconstructed high frequency band signal in a frequency region based on a high frequency band parameter as an example. Methods for obtaining a reconstructed high frequency band signal based on a high frequency band parameter in different frequency regions may be the same or may be different. The reconstructed high frequency band signal is obtained based on a reconstructed high frequency band signal in each frequency region. The high frequency band signal may be a frequency domain signal, or may be a time domain signal.

For Case 1, the high frequency band signal is reconstructed based on the quantity parameter and the location parameter of the tone component, and the amplitude parameter of the tone component.

For example, the location parameter of the tone component represents a sub-band sequence number corresponding to the location of the tone component. The quantity parameter of the tone component represents a quantity of tone components. The high frequency band signal of the current frame is reconstructed based on the quantity parameter, the location parameter, and the amplitude parameter of the tone component.

Details are as follows:

tone_pos=tile[p]+(sfb+0.5)*tone_res[p];

tone_val=pow(2.0, 0.25*tone_val_q[p][tone idx]−4.0); and p SpectralData[tone_pos]=tone_val.

tile[p] is a start frequency of a $p^{th}$ frequency region, sfb is the location parameter of the tone component (that is, the sub-band sequence number corresponding to the location of the tone component), tone_res[p] is the frequency domain resolution of the sub-band, and tone_pos indicates a location of a tone component corresponding to a $tone\_idx^{th}$ tone component in the $p^{th}$ frequency region. tone_val_q[p][tone idx] indicates an amplitude parameter of the tone component corresponding to the $tone\_idx^{th}$ tone component in the $p^{th}$ frequency region, and tone_val indicates an amplitude corresponding to the $tone\_idx^{th}$ tone component in the $p^{th}$ frequency region. pSpectralData[tone_pos] indicates a frequency domain signal corresponding to the location tone_pos of the tone component. A value range of tone_idx is [0, tone_cnt[p]−1], and tone_cnt[p] is the quantity parameter of the tone component.

In a high frequency band range, if a frequency is not equal to the location tone_pos of the tone component, a frequency domain signal on the frequency may be directly set to 0. The present disclosure imposes no limitation on a method for reconstructing another frequency on which a tone component does not exist.

For Case 2: The high frequency band signal of the current frame is reconstructed based on the location and quantity parameter and the amplitude parameter of the tone component.

(1) The location parameter of the tone component is determined based on the location and quantity parameter of the tone component.

The location and quantity parameter of the tone component may be represented by an N-bit sequence, and N is a quantity of sub-bands in a frequency region. In an example, a shift operation may be performed on the location and quantity parameter of the tone component, to determine a sequence number of a sub-band in which a tone component exists and a quantity of sub-bands in which a tone component exists in the frequency region. The sequence number of the sub-band in which a tone component exists in the frequency region is the location parameter of the tone component. The quantity of sub-bands in which a tone component exists in the frequency region is the quantity parameter of the tone component.

In a possible case, a bit sequence from a low-order bit to a high-order bit indicates sequence numbers of sub-bands in ascending order. For example, the quantity of sub-bands in the frequency region is 5, a lowest bit in the 5-bit bit sequence corresponds to a sequence number 0 of a sub-band, and a highest bit in the 5-bit bit sequence corresponds to a sequence number 4 of a sub-band. In this case, if the binary representation of the location and quantity parameter of the tone component is 10011, sequence numbers of sub-bands in which a tone component exists in the frequency region are 0, 1, and 4 respectively.

In another possible case, a bit sequence from a low-order bit to a high-order bit indicates sequence numbers of sub-bands in descending order. For example, the quantity of sub-bands in the frequency region is 5, a lowest bit in the 5-bit bit sequence corresponds to a sequence number 4 of a sub-band, and a highest bit in the 5-bit bit sequence corresponds to a sequence number 0 of a sub-band. In this case, if the binary representation of the location and quantity parameter of the tone component is 10011, sequence numbers of sub-bands in which a tone component exists in the frequency region are 0, 3, and 4 respectively.

In addition, a sequence number of a sub-band corresponding to each bit in the bit sequence may be further specified in advance. This is not limited in the present disclosure.

The quantity parameter of the tone component may be obtained when the location and quantity parameter of the tone component is determined based on the location parameter of the tone component. The quantity of sequence numbers of sub-bands in which a tone component exists in the frequency region is the quantity parameter of the tone component.

(2) The high frequency band signal is reconstructed based on the location parameter of the tone component and the amplitude parameter of the tone component.

A location of the tone component is calculated.

In an example, the location of the tone component may be calculated based on the location parameter of the tone component.

tone_pos=tile[p]+(sfb+0.5)*tone_res[p].

tile[p] is a start frequency of a $p^{th}$ frequency region, sfb is a sequence number of a sub-band in which a tone component exists in the frequency region, and tone_res[p] is a frequency domain resolution of the $p^{th}$ frequency region. The sequence number of the sub-band in which a tone component exists in the frequency region is the location parameter of the tone component. 0.5 indicates that the location of the tone component in the sub-band in which a tone component exists is the center of the sub-band. Certainly, the reconstructed tone component may alternatively be located at another location of the sub-band.

An amplitude of the tone component is calculated.

In an example, the amplitude of the tone component may be calculated based on the amplitude parameter of the tone component.

Details are as follows:

tone_val=pow(2.0, 0.25*tone_val q[p][tone_idx]−4.0).

tone_val q[p][tone idx] indicates an amplitude parameter corresponding to a tone_idx$^{th}$ location parameter in the $p^{th}$ frequency region, and tone_val indicates an amplitude of a frequency corresponding to the tone_idx$^{th}$ location parameter in the $p^{th}$ frequency region.

A value range of tone_idx is [0, tone cnt[p]−1], and tone_cnt[p] is the quantity parameter of the tone component.

The high frequency band signal is reconstructed based on the location of the tone component and the amplitude of the tone component.

A frequency domain signal corresponding to the location tone_pos of the tone component meets:

pSpectralData[tone_pos]=tone_val.

pSpectralData[tone_pos] indicates the frequency domain signal corresponding to the location tone_pos of the tone component, and tone_val indicates an amplitude of a frequency corresponding to the tone_idx$^{th}$ location parameter in the $p^{th}$ frequency region. tone_pos indicates a location of a tone component corresponding to the tone_idx$^{th}$ location parameter in the $p^{th}$ frequency region.

In a high frequency band range, if a frequency is not equal to the location tone_pos of the tone component, a frequency domain signal on the frequency may be directly set to 0. The present disclosure imposes no limitation on a method for reconstructing another frequency on which a tone component does not exist.

4: Obtain an audio signal of the current frame based on the reconstructed high frequency band signal.

Still another embodiment of the present disclosure provides an audio decoding method, including the following procedure.

1. Obtain an encoded bitstream.

2. Obtain a high frequency band parameter based on the encoded bitstream.

A high frequency band may be divided into K frequency regions (tile), and each frequency region is further divided into N sub-bands. The high frequency band parameter may be determined based on a frequency region. The following uses a method for obtaining a high frequency band parameter based on an encoded bitstream in a frequency region as an example.

(1) The bitstream is parsed to determine a location and quantity parameter of a tone component.

The location and quantity parameter of the tone component represents location information of the tone component and quantity information of the tone component. A decoder side parses the bitstream to first obtain the location and quantity parameter of the tone component. The location and quantity parameter of the tone component may be represented by an N-bit sequence, and N is a quantity of sub-bands in a frequency region.

In an example, a quantity num_subband of sub-bands in the frequency region is first determined based on a frequency domain resolution. Then, num_subband bits are read from the bitstream based on the quantity num_subband of sub-bands in the frequency region, that is, the location and quantity parameter of the tone component.

The frequency domain resolution tone_res[p] may be preset, or may be obtained by parsing the obtained encoded bitstream. Assuming that a bandwidth of a $p^{th}$ frequency region is tile_width[p], a quantity of sub-bands in the frequency region may be num_subband=tile_width[p]/tone_res[p].

For example, the quantity of sub-bands in the frequency region is 5, and five bits are read from the bitstream. A binary representation of the obtained location and quantity parameter of the tone component is 10011.

The quantity num_subband of sub-bands in the frequency region may alternatively be preset, and the num_subband bits may be read from the bitstream directly based on the quantity num_subband of sub-bands in the frequency region, that is, the location and quantity parameter of the tone component.

(2) The location parameter of the tone component and the quantity parameter of the tone component are determined based on the location and quantity parameter of the tone component.

The location and quantity parameter of the tone component may be represented by an N-bit sequence, and N is a quantity of sub-bands in a frequency region. In an example, a shift operation may be performed on the location and quantity parameter of the tone component, to determine a sequence number of a sub-band in which a tone component exists and a quantity of sub-bands in which a tone component exists in the frequency region. The sequence number of the sub-band in which a tone component exists in the frequency region is the location parameter of the tone component. The quantity of sub-bands in which a tone component exists in the frequency region is the quantity parameter of the tone component.

In a possible case, a bit sequence from a low-order bit to a high-order bit indicates sequence numbers of sub-bands in ascending order. For example, the quantity of sub-bands in the frequency region is 5, a lowest bit in the 5-bit bit sequence corresponds to a sequence number 0 of a sub-band, and a highest bit in the 5-bit bit sequence corresponds to a sequence number 4 of a sub-band. In this case, if the binary representation of the location and quantity parameter of the tone component is 10011, sequence numbers of sub-bands in which a tone component exists in the frequency region are 0, 1, and 4 respectively.

In another possible case, a bit sequence from a low-order bit to a high-order bit indicates sequence numbers of sub-bands in descending order. For example, the quantity of sub-bands in the frequency region is 5, a lowest bit in the 5-bit bit sequence corresponds to a sequence number 4 of a sub-band, and a highest bit in the 5-bit bit sequence corresponds to a sequence number 0 of a sub-band. In this case, if the binary representation of the location and quantity parameter of the tone component is 10011, sequence numbers of sub-bands in which a tone component exists in the frequency region are 0, 3, and 4 respectively.

In addition, a sequence number of a sub-band corresponding to each bit in the bit sequence may be further specified in advance. This is not limited in the present disclosure.

The quantity parameter of the tone component may be obtained when the location and quantity parameter of the tone component is determined based on the location parameter of the tone component. The quantity of sequence numbers of sub-bands in which a tone component exists in the frequency region is the quantity parameter of the tone component.

In an example, a quantity of sub-bands in which a tone component exists in the frequency region may be determined based on the location and quantity parameter of the tone component, that is, the quantity parameter tone_cnt[p] of the tone component. The quantity of sub-bands in which a tone component exists in the frequency region is equal to a quantity of bits whose values are 1 in the binary representation of the location and quantity parameter of the tone component.

For example, the binary representation of the location and quantity parameter of the tone component is 10011. In this case, the quantity of sub-bands in which a tone component exists in the frequency region is equal to 3, that is, the location parameter tone_cnt[p] of the tone component is equal to 3.

Certainly, 0 may also be used to indicate that a tone component exists in a sub-band. In this case, when the binary representation of the location and quantity parameter of the tone component is 10011, the quantity of sub-bands in which a tone component exists in the frequency region is equal to 2, that is, the quantity parameter tone_cnt[p] of the tone component is equal to 2.

(3) The bitstream is parsed based on the quantity parameter of the tone component, to determine the amplitude parameter of the tone component.

In an example, the amplitude parameter of the tone component may be obtained by parsing the bitstream sequentially based on a preset quantity of bits, and a quantity of amplitude parameters of the tone component is equal to the quantity parameter of the tone component, that is, the amplitude parameter of the tone component tone_val_q[p][i], where i=0, . . . , tone_cnt[p]−1.

3. Obtain a reconstructed high frequency band signal based on the high frequency band parameter.

A high frequency band may be divided into K frequency regions (tile), and each frequency region is further divided into N sub-bands. The high frequency band signal may be reconstructed based on a frequency region. The following uses a method for obtaining a reconstructed high frequency band signal in a frequency region based on a high frequency band parameter as an example. The reconstructed high frequency band signal is obtained based on a reconstructed high frequency band signal in each frequency region. The high frequency band signal may be a frequency domain signal, or may be a time domain signal.

In an example, the high frequency band signal of the current frame may be reconstructed based on the location parameter, the quantity parameter, and the amplitude parameter of the tone component. The quantity parameter of the tone component represents a quantity of tone components. A method for reconstructing a tone component at a location may be as follows.

(1) A location of the tone component is calculated.

In an example, the location of the tone component may be calculated based on the location parameter of the tone component.

tone_pos=tile[p]+(sfb+0.5)*tone_res[p].

tile[p] is a start frequency of a $p^{th}$ frequency region, sfb is a sequence number of a sub-band in which a tone component exists in the frequency region, and tone_res[p] is a frequency domain resolution of the $p^{th}$ frequency region. The sequence number of the sub-band in which a tone component exists in the frequency region is the location parameter of the tone component. 0.5 indicates that the location of the tone component in the sub-band in which a tone component exists is the center of the sub-band. Certainly, the reconstructed tone component may alternatively be located at another location of the sub-band.

(2) An amplitude of the tone component is calculated.

In an example, the amplitude of the tone component may be calculated based on the amplitude parameter of the tone component.

Details are as follows:

tone_val=pow(2.0, 0.25*tone_val_q[p][tone_idx]−4.0).

tone_val q[p][tone_idx] indicates an amplitude parameter corresponding to a tone_idx$^{th}$ location parameter in the p$^{th}$ frequency region, and tone_val indicates an amplitude of a frequency corresponding to the tone_idx$^{th}$ location parameter in the p$^{th}$ frequency region.

A value range of tone idx is [0, tone_cnt[p]-1], and tone_cnt[p] is the quantity parameter of tone components.

(3) The high frequency band signal is reconstructed based on the location of the tone component and the amplitude of the tone component.

A frequency domain signal corresponding to the location tone_pos of the tone component meets:

p SpectralData[tone_pos]=tone_val.

pSpectralData[tone_pos] indicates the frequency domain signal corresponding to the location tone_pos of the tone component, and tone_val indicates an amplitude of a frequency corresponding to the tone_idx$^{th}$ location parameter in the p$^{th}$ frequency region. tone_pos indicates a location of a tone component corresponding to the tone_idx$^{th}$ location parameter in the p$^{th}$ frequency region.

In a high frequency band range, if a frequency is not equal to the location tone_pos of the tone component, a frequency domain signal on the frequency may be directly set to 0. The present disclosure imposes no limitation on a method for reconstructing another frequency on which a tone component does not exist.

4: Obtain an audio signal of the current frame based on the reconstructed high frequency band signal.

It can be learned from the foregoing descriptions that, in this embodiment of the present disclosure, an audio encoder encodes the location, the quantity, and the amplitude or the energy of the tone component in the high frequency band signal, so that the audio decoder recovers the tone component based on the location, the quantity, and the amplitude or the energy of the tone component. Therefore, the location and the energy of the recovered tone component are more accurate, thereby improving quality of a decoded signal.

Figure 6:
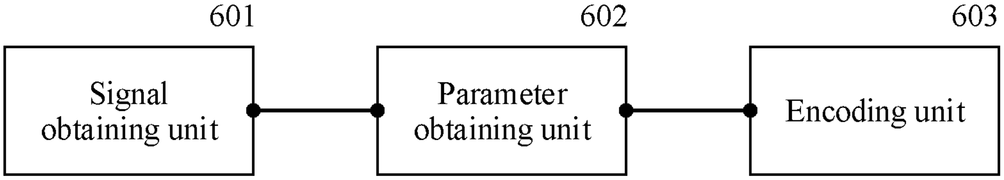
FIG. 6 is a schematic diagram of a composition structure of an audio encoding device according to an embodiment of this application.

FIG. 6 describes a structure of an audio encoder according to an embodiment of the present disclosure, including a signal obtaining unit 601, configured to obtain a current frame of an audio signal, where the current frame includes a high frequency band signal and a low frequency band signal; a parameter obtaining unit 602, configured to obtain a high frequency band parameter of the current frame based on the high frequency band signal, where the high frequency band parameter is used to indicate a location, a quantity, and an amplitude or energy of a tone component included in the high frequency band signal; and an encoding unit 603, configured to perform bitstream multiplexing on the high frequency band encoding parameter, to obtain an encoded bitstream.

In an implementation, the audio encoder may further include a determining unit, configured to determine whether the current frequency region includes a tone component; and the parameter obtaining unit is configured to, when the current frequency region includes a tone component, determine the location and quantity parameter of the tone component in the current frequency region in the at least one frequency region and the amplitude parameter or the energy parameter of the tone component in the current frequency region based on the high frequency band signal of the current frequency region.

For specific implementation of the audio encoder, refer to the foregoing audio encoding method. Details are not described herein again.

It can be learned from the foregoing descriptions that, in this embodiment of the present disclosure, an audio encoder encodes the location, the quantity, and the amplitude or the energy of the tone component in the high frequency band signal, so that the audio decoder recovers the tone component based on the location, the quantity, and the amplitude or the energy of the tone component. Therefore, the location and the energy of the recovered tone component are more accurate, thereby improving quality of a decoded signal.

Figure 7:
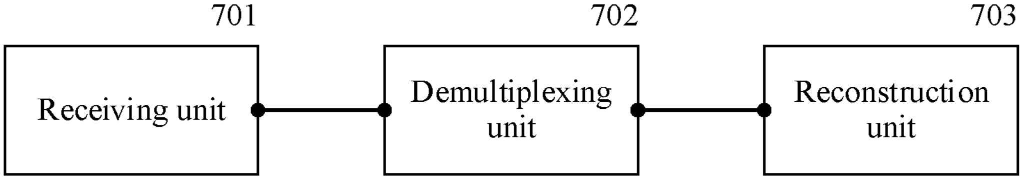
FIG. 7 is a schematic diagram of a composition structure of an audio decoding device according to an embodiment of this application.

FIG. 7 describes a structure of an audio decoder according to an embodiment of the present disclosure, including a receiving unit 701, configured to obtain an encoded bitstream; a demultiplexing unit 702, configured to perform bitstream demultiplexing on the encoded bitstream, to obtain a high frequency band parameter of a current frame of an audio signal, where the high frequency band parameter is used to indicate a location, a quantity, and an amplitude or energy of a tone component included in a high frequency band signal of the current frame; and a reconstruction unit 703, configured to obtain a reconstructed high frequency band signal of the current frame based on the high frequency band parameter; and obtain an audio output signal of the current frame based on the reconstructed high frequency band signal of the current frame.

For specific implementation of the audio decoder, refer to the foregoing audio decoding method. Details are not described herein again.

It can be learned from the foregoing descriptions that, in this embodiment of the present disclosure, an audio encoder encodes the location, the quantity, and the amplitude or the energy of the tone component in the high frequency band signal, so that the audio decoder recovers the tone component based on the location, the quantity, and the amplitude or the energy of the tone component. Therefore, the location and the energy of the recovered tone component are more accurate, thereby improving quality of a decoded signal.

It should be noted that content such as information exchange between the modules/units of the apparatus and the execution processes thereof is based on a same concept as the method embodiments of this application, and achieves same technical effects as the method embodiments of this application. For specific content, refer to the foregoing description in the method embodiments of this application. Details are not described herein again.

An embodiment of this application further provides a computer storage medium. The computer storage medium stores a program. The program is executed to perform some or all of the steps recorded in the method embodiments.

Figure 8:
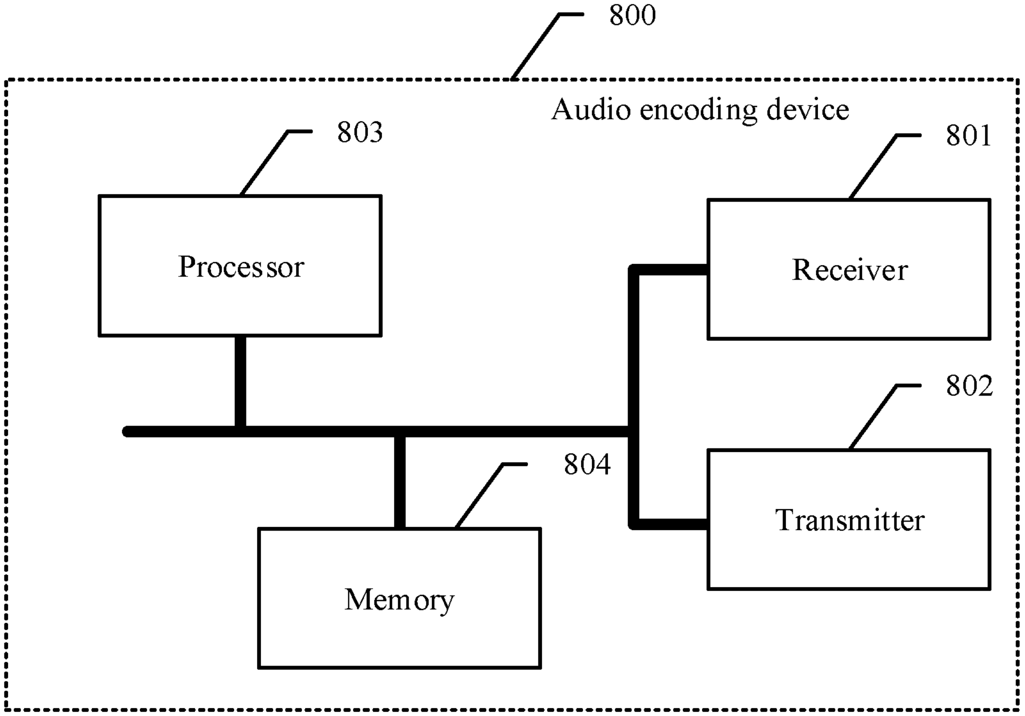
FIG. 8 is a schematic diagram of a composition structure of another audio encoding device according to an embodiment of this application.

The following describes another audio encoding device according to an embodiment of this application. Referring to FIG. 8, the audio encoding device 800 includes a receiver 801, a transmitter 802, a processor 803, and a memory 804 (there may be one or more processors 803 in the audio encoding device 800, and an example in which there is one processor is used in FIG. 8). In some embodiments of this application, the receiver 801, the transmitter 802, the processor 803, and the memory 804 may be connected by using a bus or in another manner. In FIG. 8, an example in which the receiver 801, the transmitter 802, the processor 803, and the memory 804 are connected by using the bus is used.

The memory 804 may include a read-only memory and a random access memory, and provide instructions and data to the processor 803. A part of the memory 804 may further include a non-volatile random-access memory (NVRAM). The memory 804 stores an operating system and an operation instruction, an executable module or a data structure, or a subnet thereof, or an extended set thereof. The operation instruction may include various operation instructions, to implement various operations. The operating system may include various system programs, to implement various basic services and process hardware-based tasks.

The processor 803 controls an operation of the audio encoding device, and the processor 803 may also be referred to as a central processing unit (CPU). In specific application, components of the audio encoding device are coupled together by using a bus system. In addition to a data bus, the bus system may further include a power bus, a control bus, and a status signal bus. However, for clear description, various types of buses in the figure are marked as the bus system.

The method disclosed in the foregoing embodiments of this application may be applied to the processor 803, or may be implemented by the processor 803. The processor 803 may be an integrated circuit chip and has a signal processing capability. In an implementation process, steps in the foregoing methods can be implemented by using a hardware integrated logical circuit in the processor 803, or by using instructions in a form of software. The processor 803 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly performed and completed by a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 804, and a processor 803 reads information in the memory 804 and completes the steps in the foregoing methods in combination with hardware of the processor.

The receiver 801 may be configured to receive input number or character information, and generate signal input related to related settings and function control of the audio encoding device. The transmitter 802 may include a display device such as a display, and the transmitter 802 may be configured to output number or character information through an external interface.

In this embodiment of this application, the processor 803 is configured to perform the foregoing audio encoding method shown in FIG. 2.

Figure 9:
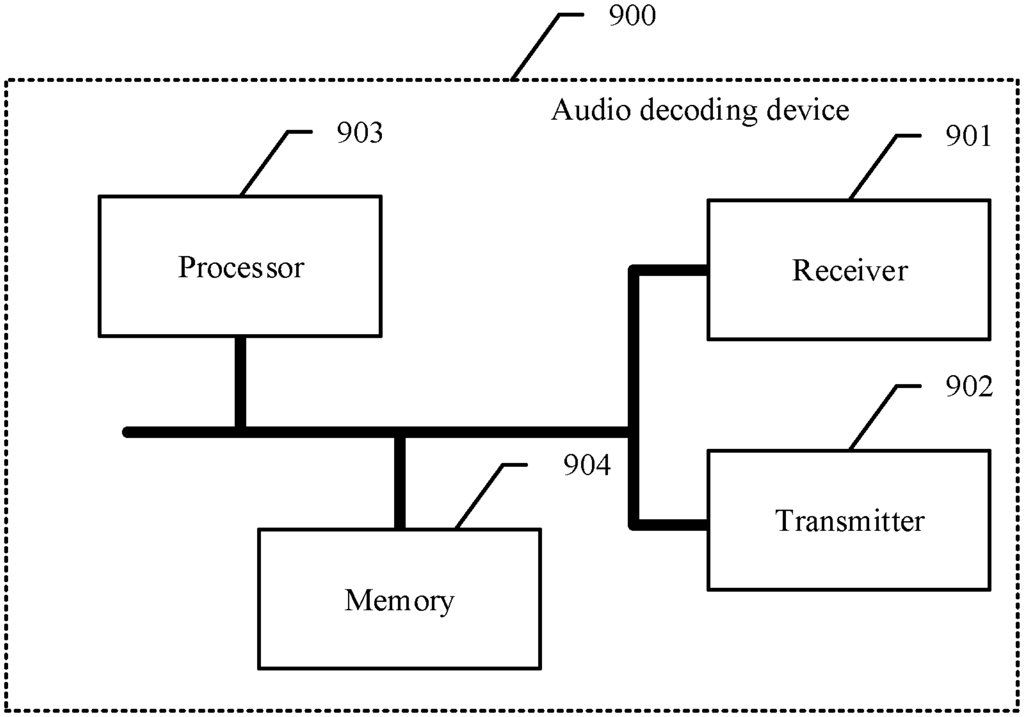
FIG. 9 is a schematic diagram of a composition structure of another audio decoding device according to an embodiment of this application.

The following describes another audio decoding device according to an embodiment of this application. Referring to FIG. 9, the audio decoding device 900 includes a receiver 901, a transmitter 902, a processor 903, and a memory 904 (there may be one or more processors 903 in the audio decoding device 900, and an example in which there is one processor is used in FIG. 9). In some embodiments of this application, the receiver 901, the transmitter 902, the processor 903, and the memory 904 may be connected by using a bus or in another manner. In FIG. 9, a connection by using the bus is used as an example.

The memory 904 may include a read-only memory and a random access memory, and provide instructions and data to the processor 903. A part of the memory 904 may further include an NVRAM. The memory 904 stores an operating system and an operation instruction, an executable module or a data structure, or a subset thereof, or an extended set thereof. The operation instruction may include various operation instructions to implement various operations. The operating system may include various system programs, to implement various basic services and process hardware-based tasks.

The processor 903 controls an operation of the audio decoding device, and the processor 903 may also be referred to as a CPU. In specific application, the components of the audio decoding device are coupled together by using a bus system. In addition to a data bus, the bus system may further include a power bus, a control bus, and a status signal bus. However, for clear description, various types of buses in the figure are marked as the bus system.

The methods disclosed in the embodiments of this application may be applied to the processor 903, or implemented by the processor 903. The processor 903 may be an integrated circuit chip and has a signal processing capability. In an implementation process, the steps in the foregoing methods can be implemented by using a hardware integrated logical circuit in the processor 903, or by using instructions in a form of software. The foregoing processor 903 may be a general purpose processor, a DSP, an ASIC, an FPGA or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly performed and completed by a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 904, and the processor 903 reads information in the memory 904 and completes the steps in the foregoing methods in combination with hardware of the processor.

In this embodiment of this application, the processor 903 is configured to perform the foregoing audio decoding method shown in FIG. 3.

In another possible design, when the audio encoding device or the audio decoding device is a chip in a terminal, the chip includes a processing unit and a communications unit. The processing unit may be, for example, a processor. The communications unit may be, for example, an input/output interface, a pin, or a circuit. The processing unit may execute computer-executable instructions stored in a storage unit, so that the chip in the terminal performs the method in the first aspect. Optionally, the storage unit is a storage unit in the chip, for example, a register or a cache. Alternatively, the storage unit may be a storage unit that is in the terminal and that is located outside the chip, for example, a read-only memory (ROM) or another type of static storage device that may store static information and instructions, for example, a random-access memory (RAM).

The processor mentioned anywhere above may be a general-purpose central processing unit, a microprocessor, an ASIC, or one or more integrated circuits configured to control program execution of the method according to the first aspect.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all the modules may be selected according to an actual need to achieve the objectives of the solutions of the embodiments. In addition, in the accompanying drawings of the apparatus embodiments provided in this application, connection relationships between modules indicate that the modules have communications connections with each other, which may be implemented as one or more communications buses or signal cables.

Based on the description of the foregoing implementations, a person skilled in the art may clearly understand that this application may be implemented by software in addition to necessary universal hardware, or certainly may be implemented by dedicated hardware, including an application-specific integrated circuit, a dedicated CPU, a dedicated memory, a dedicated component, and the like. Generally, any functions that can be performed by a computer program can be easily implemented by using corresponding hardware, and a specific hardware structure used to achieve a same function may be of various forms, for example, in a form of an analog circuit, a digital circuit, a dedicated circuit, or the like. However, in this application, a software program implementation is a better implementation in most cases. Based on such an understanding, the technical solutions of this application essentially or the part contributing to the conventional technology may be implemented in a form of a software product. The software product is stored in a readable storage medium, such as a floppy disk, a Universal Serial Bus (USB) flash drive, a removable hard disk, a ROM, a RAM, a magnetic disk, or a compact disc, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk or a magnetic tape), an optical medium (for example, a digital versatile disc (DVD), a semiconductor medium (for example, a solid-state drive (SSD)), or the like.

What is claimed is:

1. An audio decoding method, comprising:

obtaining an encoded bitstream;

performing bitstream demultiplexing on the encoded bitstream to:

obtain a high frequency band parameter of a current frame of an audio signal, wherein the high frequency band parameter comprises a combined location and quantity parameter and either a first amplitude parameter or a first energy parameter of a tone component in a high frequency band signal of the current frame, and wherein a high frequency band corresponding to the high frequency band signal comprises at least one frequency region;

obtain a second combined location and a quantity parameter in the at least one frequency region; and parse the encoded bitstream based on the second combined location and the quantity parameter to obtain a second amplitude parameter or a second energy parameter of the tone component in the current frequency region;

obtaining a reconstructed high frequency band signal of the current frame based on the high frequency band parameter; and obtaining an audio output signal of the current frame based on the reconstructed high frequency band signal.

2. The audio decoding method of claim 1, wherein the at least one frequency region comprises at least one sub-band, wherein the combined location and quantity parameter comprises the combined location and quantity parameter of a tone component in the at least one frequency region, and wherein the first amplitude parameter or the first energy parameter comprises an amplitude parameter or an energy parameter of the tone component in the at least one frequency region.

3. The audio decoding method of claim 2, wherein the performing comprises:

obtaining a second combined location and quantity parameter of a tone component in a current frequency region in the at least one frequency region;

determining a location parameter of the tone component in the current frequency region and a quantity parameter of the tone component in the current frequency region based on the second combined location and quantity parameter; and parsing the encoded bitstream based on the quantity parameter of the tone component in the current frequency region to obtain the second amplitude parameter or the second energy parameter of the tone component in the current frequency region.

4. The audio decoding method of claim 3, wherein obtaining the reconstructed high frequency band signal comprises:

determining a second location of the tone component in the current frequency region based on the location parameter;

determining, based on the second amplitude parameter or the second energy parameter, a second amplitude or a second energy corresponding to the second location of the tone component; and obtaining the reconstructed high frequency band signal based on the second location of the tone component and the second amplitude or the second energy.

5. The audio decoding method of claim 1, wherein obtaining the second amplitude parameter or the second energy parameter comprises:

determining a quantity parameter of the tone component in the current frequency region based on the second combined location and quantity parameter; and parsing the encoded bitstream based on the quantity parameter of the tone component in the current frequency region to obtain the second amplitude parameter or the second energy parameter of the tone component in the current frequency region.

6. The audio decoding method of claim 1, wherein obtaining the second combined location and quantity parameter comprises:

obtaining tone component indication information of the current frequency region, wherein the tone component indication information indicates whether the current frequency region comprises a tone component; and either obtaining the second combined location and quantity parameter when the current frequency region comprises a tone component; or obtaining the second combined location and quantity parameter by reading N bits from the encoded bitstream based on a quantity of sub-bands comprised in the current frequency region, wherein the N bits are comprised in the second combined location and quantity parameter, wherein N is the quantity of sub-bands comprised in the current frequency region, and wherein the N bits are in a one-to-one correspondence with the sub-bands comprised in the current frequency region.

7. The audio decoding method of claim 1, wherein obtaining the reconstructed high frequency band signal of the current frame based on the high frequency band parameter comprises:

determining a second location of the tone component in the current frequency region based on the second combined location and quantity parameter;

determining, based on the second amplitude parameter or the second energy parameter, a second amplitude or a second energy corresponding to the second location of the tone component; and obtaining the reconstructed high frequency band signal based on the second location of the tone component and the second amplitude or the second energy.

8. The audio decoding method of claim 7, wherein determining the second location of the tone component comprises:

determining a location parameter of the tone component in the current frequency region based on the second combined location and quantity parameter; and determining the second location of the tone component based on the location parameter of the tone component in the current frequency region.

9. The audio decoding method of claim 7, wherein obtaining the reconstructed high frequency band signal comprises determining a frequency domain signal at the second location according to the following equation:

pSpectralData[tone_pos]=tone_val, wherein pSpectralData represents the reconstructed high frequency band signal in the current frequency region, tone_val represents the second amplitude corresponding to the second location of the tone component , and tone_pos represents the second location of the tone component.

10. An audio decoder, comprising:

one or more processors; and a memory coupled to the one or more processors and configured to store programming instructions that, when executed by the processor, cause the audio decoder to be configured to:

obtain an encoded bitstream;

perform bitstream demultiplexing on the encoded bitstream to:

obtain a high frequency band parameter of a current frame of an audio signal, wherein the high frequency band parameter comprises a combined location and quantity parameter and either an amplitude or an energy of a tone component in a high frequency band signal of the current frame, and wherein a high frequency band corresponding to the high frequency band signal comprises at least one frequency region;

obtain a second combined location and a quantity parameter in a current frequency region in the at least one frequency region; and parse the encoded bitstream based on the second combined location and the quantity parameter to obtain a second amplitude parameter or a second energy parameter of the tone component in the current frequency region;

obtain a reconstructed high frequency band signal of the current frame based on the high frequency band parameter; and obtain an audio output signal of the current frame based on the reconstructed high frequency band signal.

11. The audio decoder of claim 10, wherein the at least one frequency region comprises at least one sub-band, wherein the combined location and quantity parameter that is comprised in the high frequency band parameter comprises the location and quantity parameter of a tone component in the at least one frequency region, and wherein the first amplitude parameter or the first energy parameter comprises an amplitude parameter or an energy parameter of the tone component in the at least one frequency region.

12. The audio decoder of claim 11, wherein the programming instructions, when executed by the one or more processors, further cause the audio decoder to be configured to:

obtain a second combined location and quantity parameter of a tone component in a current frequency region in the at least one frequency region;

determine a location parameter of the tone component in the current frequency region and a quantity parameter of the tone component in the current frequency region based on the second combined location and quantity parameter; and parse the encoded bitstream based on the quantity parameter of the tone component in the current frequency region to obtain the second amplitude parameter or the second energy parameter of the tone component in the current frequency region.

13. The audio decoder of claim 12, wherein the programming instructions, when executed by the one or more processors, further cause the audio decoder to be configured to:

determine a second location of the tone component in the current frequency region based on the location parameter;

determine, based on the second amplitude parameter or the second energy parameter, a second amplitude or a second energy corresponding to the second location of the tone component; and obtain the reconstructed high frequency band signal based on the second location of the tone component and either the second amplitude or the second energy.

14. The audio decoder of claim 10, wherein the programming instructions, when executed by the one or more processors, further cause the audio decoder to be configured to:

determine a quantity parameter of the tone component in the current frequency region based on the second combined location and quantity parameter; and parse the encoded bitstream based on the quantity parameter of the tone component in the current frequency region to obtain the second amplitude parameter or the second energy parameter of the tone component in the current frequency region.

15. The audio decoder of claim 10, wherein the programming instructions, when executed by the one or more processors, further cause the audio decoder to be configured to:

obtain tone component indication information of the current frequency region, wherein the tone component indication information indicates whether the current frequency region comprises a tone component; and either obtain the second combined location and quantity parameter when the current frequency region comprises a tone component; or obtain the second combined location and quantity parameter by reading N bits from the encoded bitstream based on a quantity of sub-bands comprised in the current frequency region, wherein the N bits are comprised in the second combined location and quantity parameter, wherein N is the quantity of sub-bands comprised in the current frequency region, and wherein the N bits are in a one-to-one correspondence with the sub-bands comprised in the current frequency region.

16. The audio decoder of claim 10, wherein the programming instructions, when executed by the one or more processors, further cause the audio decoder to be configured to:

determine a second location of the tone component in the current frequency region based on the second combined location and quantity parameter;

determine, based on the second amplitude parameter or the second energy parameter, a second amplitude or a second energy corresponding to the second location of the tone component; and obtain the reconstructed high frequency band signal based on the second location of the tone component and either the second amplitude or the second energy.

17. The audio decoder of claim 16, wherein the programming instructions, when executed by the one or more processors, further cause the audio decoder to be configured to:

determine a location parameter of the tone component in the current frequency region based on the second combined location and quantity parameter; and determine the second location of the tone component based on the location parameter of the tone component in the current frequency region.

18. The audio decoder of claim 16, wherein the programming instructions, when executed by the one or more processors, further cause the audio decoder to be configured to determine a frequency domain signal at the second location of the following equation:

pSpectralData[tone_pos]=tone_val, wherein pSpectralData represents the reconstructed high frequency band signal in the current frequency region, tone_val represents the second amplitude corresponding to the second location of the tone component, and tone_pos represents the second location of the tone component.

19. A non-transitory computer-readable storage medium storing computer instructions that, when executed by one or more processors of an audio encoder, cause the audio encoder to be configured to:

obtain an encoded bitstream;

perform bitstream demultiplexing on the encoded bitstream to obtain a high frequency band parameter of a current frame of an audio signal, wherein the high frequency band parameter comprises a combined location and quantity parameter and either an amplitude or an energy of a tone component comprised in a high frequency band signal of the current frame, and wherein a high frequency band corresponding to the high frequency band signal comprises at least one frequency region;

obtain a second combined location and a quantity parameter in a current frequency region in the at least one frequency region;

parse the encoded bitstream based on the second combined location and the quantity parameter to obtain a second amplitude parameter or a second energy parameter of the tone component in the current frequency region;

obtain a reconstructed high frequency band signal of the current frame based on the high frequency band parameter; and obtain an audio output signal of the current frame based on the reconstructed high frequency band signal.

20. The non-transitory computer-readable storage medium storing computer instructions of claim 19, wherein the computer instructions, when executed by the one or more processors, further cause the audio decoder to be configured to:

determine a quantity parameter of the tone component in the current frequency region based on the second combined location and quantity parameter; and parse the encoded bitstream based on the quantity parameter of the tone component in the current frequency region to obtain the second amplitude parameter or the second energy parameter of the tone component in the current frequency region.

21. The non-transitory computer-readable storage medium storing computer instructions of claim 19, wherein the computer instructions, when executed by the one or more processors, further cause the audio decoder to be configured to:

obtain tone component indication information of the current frequency region, wherein the tone component indication information indicates whether the current frequency region comprises a tone component; and either obtain the second combined location and quantity parameter when the current frequency region comprises a tone component; or obtain the second combined location and quantity parameter by reading N bits from the encoded bitstream based on a quantity of sub-bands comprised in the current frequency region, wherein the N bits are comprised in the second combined location and quantity parameter, wherein N is the quantity of sub-bands comprised in the current frequency region, and wherein the N bits are in a one-to-one correspondence with the sub-bands comprised in the current frequency region.

22. The non-transitory computer-readable storage medium storing computer instructions of claim 19, wherein the computer instructions, when executed by the one or more processors, further cause the audio decoder to be configured to:

determine a second location of the tone component in the current frequency region based on the second combined location and quantity parameter;

determine, based on the second amplitude parameter or the second energy parameter, a second amplitude or a second energy corresponding to the second location of the tone component; and obtain the reconstructed high frequency band signal based on the second location of the tone component and either the second amplitude or the second energy.

23. The non-transitory computer-readable storage medium storing computer instructions of claim 19, wherein the computer instructions, when executed by the one or more processors, further cause the audio decoder to be configured to determine a frequency domain signal at the second location of the following equation:

pSpectralData[tone_pos]=tone_val, wherein pSpectralData represents the reconstructed high frequency band signal in the current frequency region, tone_val represents the second amplitude corresponding to the second location of the tone component, and tone_pos represents the second location of the tone component.

* * * * *